US 010373194 B2

United States Patent
Opie et al.

(10) Patent No.: US 10,373,194 B2
(45) Date of Patent: Aug. 6, 2019

(54) SYSTEM AND METHOD FOR MEASURING ADVERTISING EFFECTIVENESS

(71) Applicant: Datalogix Holdings, Inc., Redwood Shores, CA (US)

(72) Inventors: Robin Opie, Lafayette, CO (US); Audrey Lynn Thompson, Denver, CO (US); Damian Vallejo Wandler, Denver, CO (US); Donald Edward Hussen, II, Golden, CO (US)

(73) Assignee: Datalogix Holdings, Inc., Redwood Shores, CA (US)

( * ) Notice: Subject to any disclaimer, the term of this patent is extended or adjusted under 35 U.S.C. 154(b) by 0 days.

(21) Appl. No.: 13/771,627

(22) Filed: Feb. 20, 2013

(65) Prior Publication Data

US 2014/0236706 A1 Aug. 21, 2014

(51) Int. Cl.
*G06Q 30/02* (2012.01)

(52) U.S. Cl.
CPC ..... *G06Q 30/0246* (2013.01); *G06Q 30/0242* (2013.01)

(58) Field of Classification Search
CPC ..................................................... G06Q 30/02
USPC ..................................................... 705/14.41
See application file for complete search history.

(56) References Cited

U.S. PATENT DOCUMENTS

| | | | |
|---|---|---|---|
| 5,111,395 A | 5/1992 | Smith et al. | |
| 5,499,359 A | 3/1996 | Vijaykumar et al. | |
| 5,819,291 A | 10/1998 | Haimowitz et al. | |
| 6,026,398 A | 2/2000 | Brown et al. | |
| 6,061,798 A | 5/2000 | Coley et al. | |
| 6,523,041 B1 | 2/2003 | Morgan et al. | |
| 6,697,799 B1 | 2/2004 | Neal et al. | |
| 7,158,943 B2 * | 1/2007 | van der Riet | 705/14.41 |
| 7,257,596 B1 | 8/2007 | Williams et al. | |
| 7,461,263 B2 | 12/2008 | Prince | |
| 7,577,680 B1 | 8/2009 | Williams et al. | |
| 7,644,121 B2 | 1/2010 | Swanson et al. | |
| 7,904,337 B2 | 3/2011 | Morsa | |
| 7,912,865 B2 | 3/2011 | Akerma et al. | |

(Continued)

OTHER PUBLICATIONS

U.S. Office Action dated Feb. 26, 2013 for corresponding U.S. Appl. No. 13/644,736.

*Primary Examiner* — Sun M Li
*Assistant Examiner* — Thuy N Nguyen
(74) *Attorney, Agent, or Firm* — Invoke

(57) ABSTRACT

In some embodiments, a method defines a test group from a population of consumers that have been exposed to a communication associated with a promoted entity. The test group includes a (1) retailer profile, and (2) a first purchase amount associated with the promoted entity. The method also includes receiving purchase information associated with a third party. The purchase information includes (1) a second purchase amount associated with the promoted entity, and (2) a third purchase amount associated with the promoted entity. The method further includes defining a first multiplier based on a relationship between the first purchase amount and the second purchase amount, and defining a second multiplier based on a relationship between the first purchase amount and the third purchase amount. The method additionally includes sending a signal indicative of a combined multiplier based on (1) the first multiplier, and (2) the second multiplier.

24 Claims, 11 Drawing Sheets

(56) References Cited

U.S. PATENT DOCUMENTS

| | | | |
|---|---|---|---|
| 7,949,561 B2 * | 5/2011 | Briggs | 705/14.41 |
| 7,992,199 B1 | 8/2011 | Winick et al. | |
| 7,992,210 B2 | 8/2011 | McKenna | |
| 8,074,882 B2 | 12/2011 | Dmitriev et al. | |
| 8,082,177 B2 | 12/2011 | Williams et al. | |
| 8,135,747 B2 | 3/2012 | Anzalone et al. | |
| 8,136,034 B2 | 3/2012 | Stanton et al. | |
| 8,185,437 B2 | 5/2012 | Altberg et al. | |
| 8,224,971 B1 * | 7/2012 | Miller | H04L 12/4641 370/254 |
| 8,458,195 B1 | 6/2013 | Procopio | |
| 2002/0052925 A1 | 5/2002 | Kim et al. | |
| 2002/0077901 A1 | 6/2002 | Katz | |
| 2002/0082901 A1 | 6/2002 | Dunning et al. | |
| 2004/0024632 A1 | 2/2004 | Perry | |
| 2005/0071239 A1 | 3/2005 | Tormey et al. | |
| 2006/0155764 A1 | 7/2006 | Tao | |
| 2007/0033104 A1 * | 2/2007 | Collins et al. | 705/14 |
| 2007/0038516 A1 | 2/2007 | Apple et al. | |
| 2007/0124290 A1 | 5/2007 | Swanson et al. | |
| 2007/0199064 A1 * | 8/2007 | Pueblas | H04L 67/06 726/13 |
| 2008/0103888 A1 | 5/2008 | Weir | |
| 2009/0132366 A1 | 5/2009 | Lam et al. | |
| 2009/0182702 A1 | 7/2009 | Miller et al. | |
| 2009/0198653 A1 | 8/2009 | Christianson et al. | |
| 2009/0204476 A1 | 8/2009 | Abraham et al. | |
| 2009/0216579 A1 | 8/2009 | Zen et al. | |
| 2009/0216641 A1 | 8/2009 | Hubbard | |
| 2009/0313463 A1 * | 12/2009 | Pang | G06F 16/217 713/150 |
| 2010/0004980 A1 | 1/2010 | Bowen | |
| 2010/0094758 A1 | 4/2010 | Chamberlain et al. | |
| 2010/0223104 A1 | 9/2010 | Patel et al. | |
| 2010/0306043 A1 * | 12/2010 | Lindsay et al. | 705/14.41 |
| 2010/0325142 A1 | 12/2010 | Anzalone et al. | |
| 2011/0016042 A1 | 1/2011 | Cho et al. | |
| 2011/0060905 A1 | 3/2011 | Stack et al. | |
| 2011/0119126 A1 | 5/2011 | Park et al. | |
| 2011/0137721 A1 * | 6/2011 | Bansal | 705/14.41 |
| 2011/0202404 A1 | 8/2011 | van der Riet | |
| 2011/0231246 A1 | 9/2011 | Bhatia et al. | |
| 2011/0231257 A1 * | 9/2011 | Winters | G06Q 30/02 705/14.53 |
| 2012/0047366 A1 * | 2/2012 | Yoo | G06F 21/566 713/171 |
| 2012/0059714 A1 | 3/2012 | Furman | |
| 2012/0072276 A1 * | 3/2012 | Stivers | 705/14.17 |
| 2012/0078932 A1 | 3/2012 | Skurtovich et al. | |
| 2012/0089455 A1 | 4/2012 | Belani et al. | |
| 2012/0054189 A1 | 6/2012 | Moonka et al. | |
| 2012/0158574 A1 | 6/2012 | Skurtovich et al. | |
| 2012/0166272 A1 | 6/2012 | Wiley et al. | |
| 2012/0166520 A1 | 6/2012 | Lindsay | |
| 2012/0173374 A1 | 7/2012 | Soroca et al. | |
| 2012/0215610 A1 | 8/2012 | Amaro et al. | |
| 2012/0296735 A1 * | 11/2012 | Hari et al. | 705/14.42 |
| 2013/0166377 A1 * | 6/2013 | Kirkby et al. | 705/14.45 |

* cited by examiner

400

---

Defining a test group from a population of consumers that have been exposed to a communication associated with a promoted entity, the test group including (1) a retailer profile, and (2) a first purchase amount associated with the promoted entity
402

↓

Receiving purchase information associated with a third party, the purchase information including (1) a second purchase amount associated with the promoted entity, and (2) a third purchase amount associated with the promoted entity
404

↓

Defining a first multiplier based on a relationship between the first purchase amount and the second purchase amount
406

↓

Defining a second multiplier based on a relationship between the first purchase amount and the third purchase amount
408

↓

Sending a signal indicative of a combined multiplier based on (1) the first multiplier, and (2) the second multiplier
410

Define a test group from a population of consumers that have been exposed to an advertisement for a promoted entity, the test group including (1) a retailer profile, and (2) a first purchase amount associated with the promoted entity
502

↓

Define a control group from a population of consumers that have not been exposed to the advertisement for the promoted entity, the control group including (1) the retailer profile, and (2) a second purchase amount associated with the promoted entity
504

↓

Receive purchase information associated with a third party, the purchase information including (1) a third purchase amount associated with the promoted entity, and (2) a fourth purchase amount associated with the promoted entity
506

↓

Define a first multiplier based on a relationship between the first purchase amount and a third purchase amount
508

↓

Define a second multiplier based on a relationship between the first purchase amount and the fourth purchase amount
510

↓

Send a signal indicative of a combined multiplier based on (1) the first multiplier, and (2) the second multiplier
512

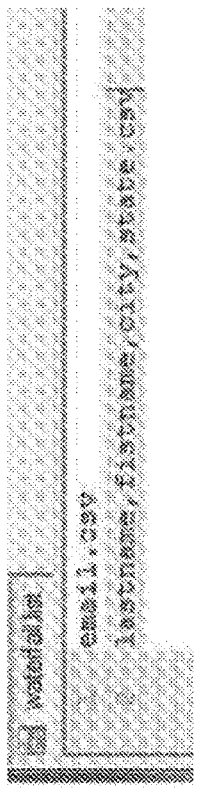

SYSTEM AND METHOD FOR MEASURING ADVERTISING EFFECTIVENESS

BACKGROUND

Some embodiments described herein relate generally to methods and apparatus for measuring advertising effectiveness.

Over the past sixty years, television has been the dominant platform for brand advertising. Consumer purchase behavior studies have demonstrated that television creates immense value by increasing consumer awareness of and loyalty to brands and/or retailers. In doing so, television ultimately increases sales and gives marketers confidence that their investment has generated hard value.

In digital media, online impressions such as clickable advertisements can be tied to online purchases of specific products and/or through specific retailers with relatively little effort. Consequently, it has been easy to establish that internet advertising is effective for direct response and for targeting 'almost ready to buy' consumers, when consumers complete the majority of their transactions online. However, the large majority of American consumer purchases are still made in-store, and online sales represent a small portion of the US market. While internet advertising is pervasive, the ability to link internet advertisement exposure with offline purchase behavior in a meaningful way has remained elusive. Without a clear realization of the sales value that internet advertising can create, advertisers will continue to have difficulty justifying significant investment in digital media.

A need exists, therefore, for methods and apparatus for measuring advertising effectiveness.

SUMMARY

In some embodiments, a method includes defining a test group from a population of consumers that have been exposed to a communication associated with a promoted entity. The test group includes a (1) retailer profile, and (2) a first purchase amount associated with the promoted entity. The method also includes receiving purchase information associated with a third party. The purchase information includes (1) a second purchase amount associated with the promoted entity, and (2) a third purchase amount associated with the promoted entity. The method further includes defining a first multiplier based on a relationship between the first purchase amount and the second purchase amount, and defining a second multiplier based on a relationship between the first purchase amount and the third purchase amount. The method additionally includes sending a signal indicative of a combined multiplier based on (1) the first multiplier, and (2) the second multiplier.

BRIEF DESCRIPTION OF THE DRAWINGS

FIG. 4 is a flow chart illustrating a method according to an embodiment.

FIG. 5 is a flow chart illustrating a process of a processor executing code, according to an embodiment.

FIGS. 9A-9L illustrate a process of matching record sets, according to an embodiment.

DETAILED DESCRIPTION

Figure 1:
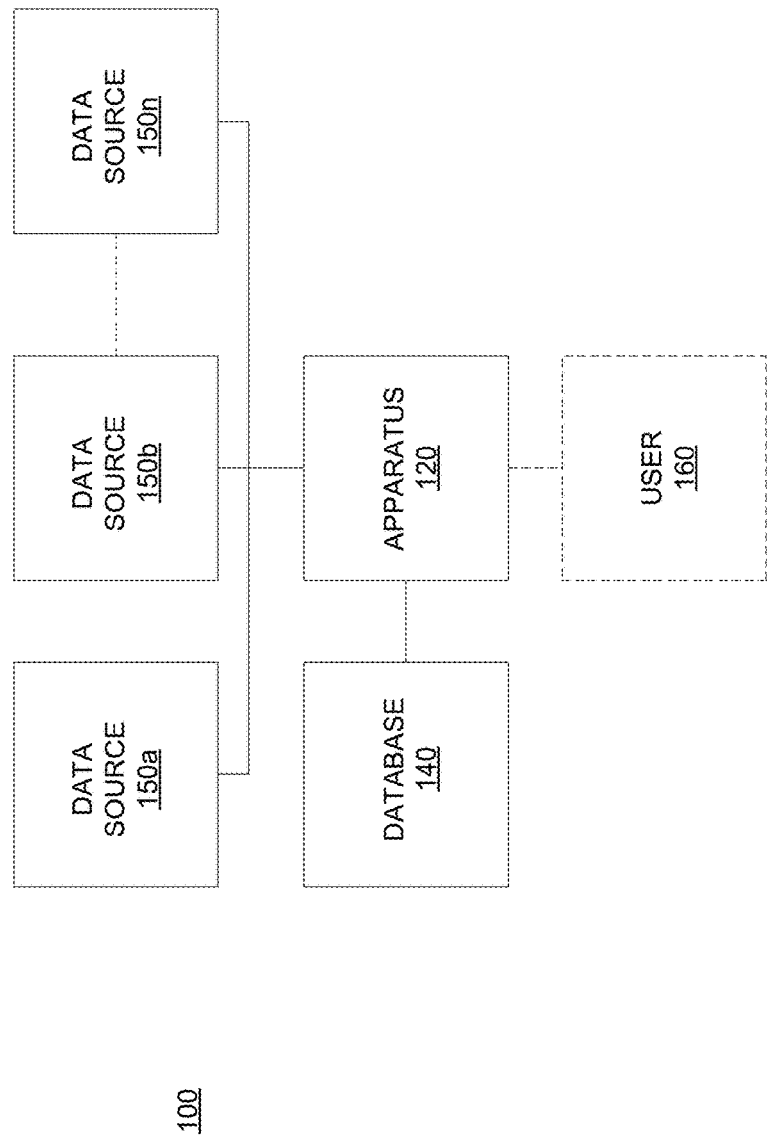
FIG. 1 is a schematic illustration of a system according to an embodiment.

In some embodiments, a method includes defining a test group from a population of consumers that have been exposed to a communication. In some embodiments, the communication is associated with a promoted entity. The promoted entity can be any suitable entity being advertised such as, but not limited to, a product, a class of products, a particular brand of a product, a retailer, a manufacturer, a group such as a trade association or a non-profit organization, a service, and/or the like. In some embodiments, the promoted entity is a particular brand of a product. In some embodiments, the promoted entity is a retailer.

The test group can include a retailer profile and a first purchase amount associated with the promoted entity. The method includes receiving purchase information associated with a third party. The purchase information can include a second purchase amount associated with the promoted entity and a third purchase amount associated with the promoted entity. A first multiplier is defined based on a relationship between the first purchase amount and the second purchase amount, and a second multiplier is defined based on a relationship between the first purchase amount and the third purchase amount. A signal is sent that is indicative of a combined multiplier based on the first multiplier, and the second multiplier.

In some embodiments, the method also includes defining a control group from a population of consumers that have not been exposed to the communication. The control group can include the retailer profile and a fourth purchase amount associated with the promoted entity. An initial effectiveness value is determined based on the first purchase amount and the fourth purchase amount. A signal is then sent that is indicative of a final effectiveness value, where the final effectiveness value is based on the initial effectiveness value, and the combined multiplier.

While described herein (for simplicity) as a communication of a promoted entity that can potentially result in a transaction/purchase, it is understood that aspects of the invention are not limited to such embodiments, and are generally applicable to any communication that can potentially result in related online and/or offline activity of interest. For example, the communication can be an awareness campaign seeking donations, and the tracked activity can be related donations. In another example, the communication can be a petition, and the tracked activity can be sign-ups for the petitions. In yet another example, the communication can be for an event, and the tracked activity can be registrations for the event.

As used herein, a module can be, for example, any assembly and/or set of operatively-coupled electrical components, and can include, for example, a memory, a processor, electrical traces, optical connectors, software (executing in hardware), and/or the like. As used herein, the singular forms "a," "an" and "the" include plural referents unless the context clearly dictates otherwise. Thus, for example, the term "a record database" is intended to mean a single database or a set of databases with similar functionalities. Furthermore, as described herein, an entity, for example a business entity associated with a computing device, can be a marketing entity, a website and/or website operator, an online and/or an offline store, a data analytics entity, etc.

FIG. 1 is a schematic illustration of an environment/system 100 within which aspects of the invention can be implemented, according to an embodiment. As shown in FIG. 1, the system 100 can include an apparatus 120 and a database 140. The apparatus 120 (and optionally, the database 140) can be connected to one or more data sources 150a, 150b . . . 150n. The apparatus 120 and/or the system 100 can be controllable by a user 160. Hence, it is understood that the user 160 can be external to the system 100, as also illustrated by the use of dashed lines to designate the user 160 and the user's connectivity to the apparatus 120. As described below, the apparatus 120 can be configured to measure advertising effectiveness.

The various components of the system 100 can be in communication (as indicated by lines in FIG. 1) via a network, which can be any type of network (e.g., a local area network or LAN, a wide area network or WAN, a virtual network, a telecommunications network, and/or the internet), implemented as a wired network and/or a wireless network. Any or all communications can be secured (e.g., encrypted) or unsecured, as is known in the art. Each of the apparatus 120, database 140, data sources 150a-n, and the user 160 can encompass a personal computer, a server, a database, a work station, a mobile device, a cloud computing environment, an application or a module running on any of these platforms, and/or the like. Additionally, it is understood that the user 160 can be any suitably representative human entity interacting with the apparatus 120, such as an actual person, an employee, and so on.

In some embodiments, at least some aspects of the apparatus 120, the database 140, and the data sources 150a-n can be commonly implemented on the same device, and/or can be commonly owned. In some embodiments, at least one of the data sources 150a-n can be a third party entity with respect to the apparatus 120.

In some embodiments, the data sources 150a-n can provide data suitable for determining effectiveness of online advertisements (e.g. for a specific advertising campaign). In other words, the data sources can provide advertising data and transaction data for the one or more promoted entities, including all relevant associated information (e.g. retailer information, customer demographics, and/or the like). In some embodiments, the promoted entity is a product and/or retailer, and the data sources 150a-n can provide household data associated with one or more of the following: a mass channel population, an advertising campaign population, a drug channel population, a grocery channel population, a supercenter channel population, and/or the like. In some embodiments, the data sources 150a-n can directly provide channel data for the one or more promoted entities, such as might be sourced directly from a manufacturer, distributor and/or any distribution chain entity for a product, for example. In some embodiments, the data sources 150a-n can provide transaction data, which can be point-of-sale based, and/or which can be at the stock keeping unit (SKU) level.

In some embodiments, an entity such as a retailer can employ aspects of the system 100 described herein to determine effectiveness of online advertisements run by or for another entity; for example, the promoted entity can be a competitor of the retailer or a product of the retailer, and/or can be otherwise related to the retailer (e.g. a sister company, an acquired company, a potential acquisition target, and/or the like). In some embodiments, the retailer can determine effectiveness of an online advertisement that targets customers of a competitor. For example, the target customer may be one that has never purchased from the retailer but has purchased at least once from the competitor, one that has comparatively purchased to a greater extent from the competitor than the retailer, and/or the like. In this manner, the retailer can determine, using aspects of the system 100, if such customers modify their purchasing behavior based on the online advertisement with respect to a specific competitor, such as by, for example, switching their purchasing from the competitor to the retailer, maintaining purchases at the competitor but purchasing from the retailer at least once (i.e. 'trying' the promoted entity), and so on.

Figure 2:
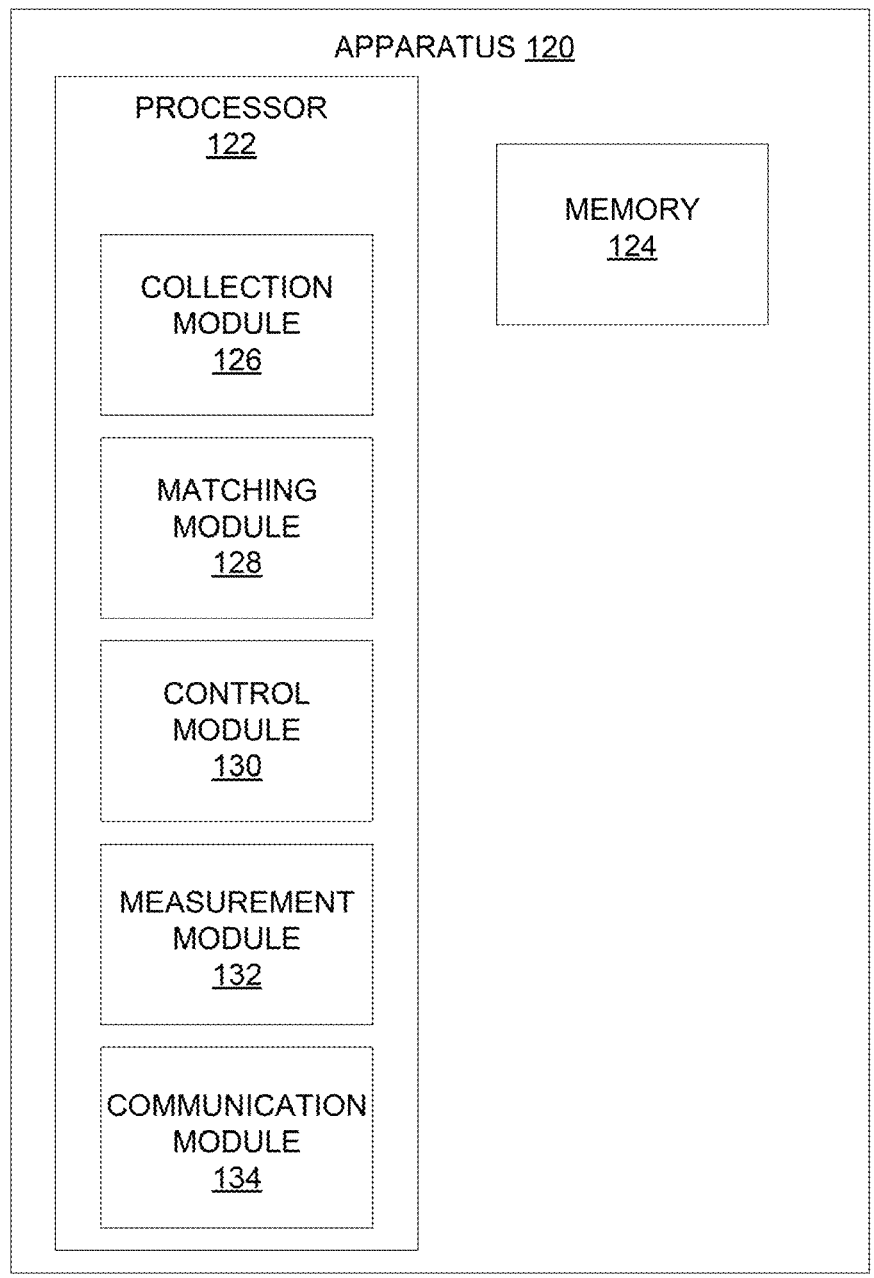
FIG. 2 is a block diagram of the apparatus 120 of FIG. 1, according to an embodiment.

FIG. 2 illustrates details of the apparatus 120, which includes at least a processor 122 and a memory 124. The processor 122 includes at least a collection module 126, a matching module 128, and a measurement module 132. The processor 122 can also include a communications module 134 for establishing and managing network connectivity of the apparatus 120 within the system 100. The processor 122 can also include a control module 130 for manipulating aspects of the apparatus 120 and/or any of the other modules described here, such as by the user 160. For example, the user 160 could specify that only the data sources 150a and 150b be used, could specify the location of the database 140, and so on. It is to be understood that the each of the modules may be in seamless communication with each other module.

The collection module 126 is configurable to collect data from the data sources 150a-n, and is further configurable to populate the database 140 with the collected data. In some embodiments, all personally identifiable information (PII) can be removed, converted, or otherwise rendered undeterminable in the collected data prior to or after storage. In some embodiments, the PII can be removed by the collection module 126 consistent with one or more privacy regulatory standards or guidelines, including those established by Direct Marketing Association, Interactive Advertising Bureau, Digital Advertising Alliance, and Network Advertising Initiative. In some embodiments, the collected data can include at least campaign data and transaction data. The campaign data can include household information and campaign information associated with the household information, such as the date and type of campaign. The transaction data can include sales information and other customer information.

In some embodiments, collection module 126 is further configurable to receive and store household (HH) information for one or more households from the data sources 150a-n in the database 140. The household information can be received by the collection module 126 in isolation or in conjunction with advertising campaign data, with transaction, data, and/or the like. In this manner, aspects of the invention can build up an extensive collection of household information over time, gleaned from potentially millions of transactions and online advertisement campaigns. The collection module 126 is further configurable to generate and assign a unique HH identifier (HHID) to information associated with each household. The HHID can be generated in any suitable manner. In some embodiments, the HHID can be generated as a function of the PII. In some embodiments, the HHID can be a hashed attribute string that is generated as disclosed in U.S. patent application Ser. No. 13/644,736 filed Oct. 4, 2012 ("the '736 application"), titled "METHOD AND APPARATUS FOR MATCHING CONSUMERS", the disclosure of which is incorporated herein in its entirety by reference.

The HH information for each household can include (but is not limited to) income, net worth, children indicators, a segment membership (e.g. lifestyle, buyer, etc.), spending information, one or more digital activity metrics, the HH identifier (HHID) and/or the like. The digital activity metric can be any suitable measure of online activity such as browsing history, online purchases, and/or the like. Since the HHID can uniquely identify a single household, it can accordingly be used for association with advertising campaign data, as well as with transaction data. In this manner, even though the collected transaction data have all PII removed, they can still be linked via the associated HHIDs.

In some embodiments, the received campaign data and the received transaction data can already have associated HHIDs. For example, when the transaction data corresponds to a purchase made by a customer at a specific retailer with a retailer's loyalty card that is associated with a loyalty account of the customer with the retailer, the transaction data can include the customer information based on the customer's loyalty account. The retailer and/or the matching module 128 can then match the customer and the transaction to an HHID.

The matching module 128 is configurable to match the received campaign data and the received transaction data in any suitable manner. In some embodiments; a matching process similar to that described in the '736 application, and briefly reiterated here, can be employed. In some embodiments, the matching module 128 is configurable to generate one or more first identification strings from the campaign data that uniquely identify a user associated with the campaign data, and to generate one or more second identification strings from the transaction data that uniquely identify a user associated with the transaction data. For example, if the campaign data is associated with a user named 'John Smith', one of the first identification strings can be 'John Smith', 'Jon Smith', 'Johnny Smith', 'Johnnie Smith', and so on. As another example, if the transaction data is associated with a user named 'John Smith' buying in Chicago, one of the first identification strings can be a combination of the name and location, such as 'SmithChicago', 'SmithChicagoIL', and so on. Each identification string can be, for example, a text string, a number, a code, a symbol, and/or combinations thereof.

In some embodiments, the received campaign and transaction data can already include the first and second identification strings, respectively. In some embodiments, the received campaign and transaction data can be encrypted; in other words, the first and second identification strings can be encrypted, either with the same encryption key or with different encryption keys. For example, as described in detail in the '736 application, the same hash function can be employed for generating hashed first and second identification strings. The first and second identification strings (encrypted or unencrypted) can then be compared, and a match can be deemed to exist when at least one of the first identification strings matches with at least one of the second identification strings, although it is understood that more than one match may be desirable and/or required. A match can be indicative of similar underlying data, and of the likelihood that the matched campaign data and transaction data are associated with the same entity, such as a household.

Separating the functionality of the collection module 126 and the matching module 128 can provide benefits for privacy of data, where the matching module may not directly interact with the data sources 150a-n, and where the collection module can remove PII and can replace it with HHIDs from the collected data prior to matching by the matching module. In some embodiments, however, the functionality of the collection module 126 and the matching module 128 can be combined, or overlap.

Figure 3:
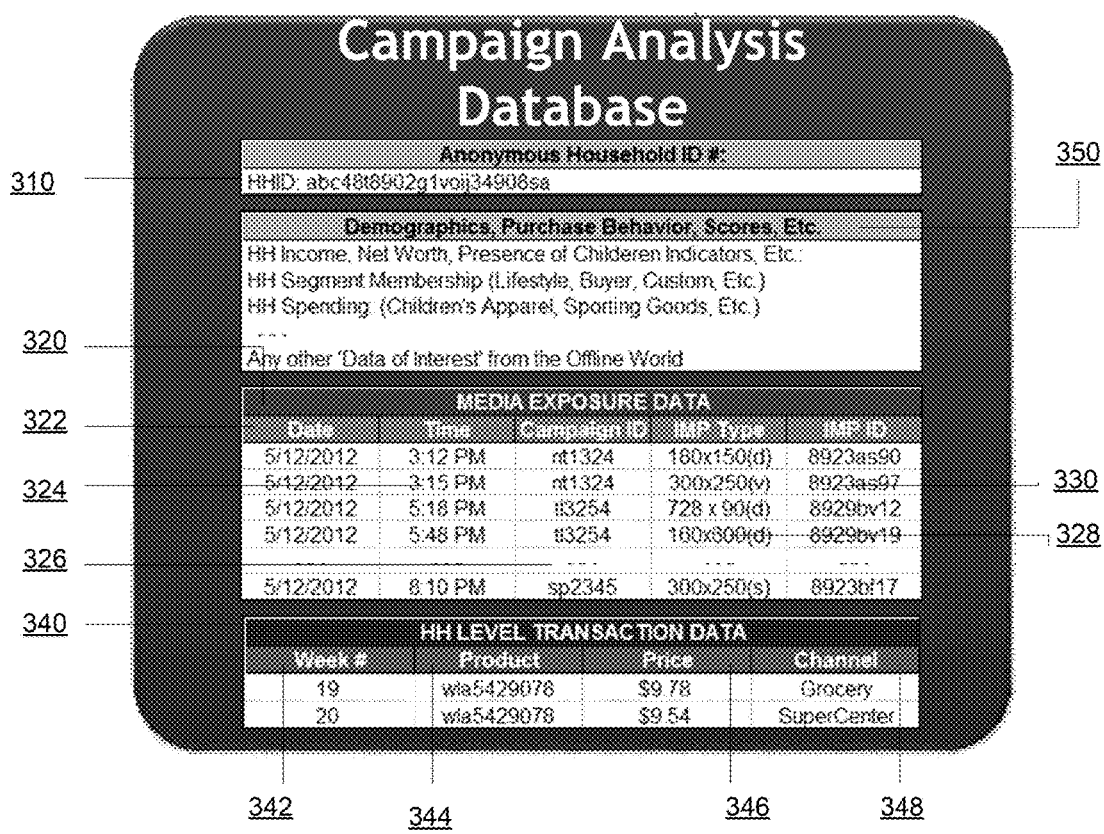
FIG. 3 is an exemplary entry in the database 140 of FIG. 1, according to an embodiment.

The combined activity of the collection module 126 and the matching module 128 can populate the database 140 with any suitable information, such as may be specified by, for example, the user 160 via the control module 130. FIG. 3 illustrates an exemplary entry 300 in the database 140 for a single HHID that includes campaign data as well as transaction data associated therewith. Each entry includes an HHID 310, as well as campaign data ('media exposure data') 320, transaction data 340 associated with the HHID. The campaign data 320 includes a date 322 and time 324 of exposure to the campaign (e.g. when exactly did the customer view the campaign advertisement), an identifier 326 for the campaign, an impression type 328 and an impression identifier 330. The impression type can be specified in any suitable manner, and in some embodiments, is a specification of image resolution, rendering location (e.g. on a third party website and/or application), format, and/or the like. For example, as illustrated in FIG. 3, 'v' can correspond to video such as an AVI video or a Flash video, 'd' can correspond to digital and can encompass digital banners, 's' can correspond to a social media impression, and so on. In some embodiments (not shown), the impression type may convey further details of the rendering location(s), such a specification of a platform (e.g. mobile device), or a location within a web page (e.g. on a web feed, or on a right hand side (RHS) banner as is commonly employed for advertising space in web page design), and/or the like. The transaction data 340 can be product specific, and includes a specification of a time 342 associated with the transaction.

It is understood that while FIG. 3 illustrates the time 342 as the week# of the campaign, any suitable timestamp information associated with the transaction is possible, including exact time, day, date, and/or the like. In some embodiments, the granularity of time information available as time 342 for each transaction can be based on a contractual agreement with the source of the campaign data 320, based on a data privacy standard, and/or the like.

The transaction data 340 of FIG. 3 can also include a product identifier 344, the amount 346 spent on the product, and the retailer profile or source 348 of the particular transaction for the product (e.g. a grocery channel). Each entry can also include, for each HHID, any other information 350 of interest for that HHID, such as might be received and/or gleaned from demographic databases, income databases, and/or the like, as illustrated.

Referring again to FIG. 1, the measurement module 132 is configurable to utilize the database 140, which has been populated from the data sources 150a-n as described above, to determine effectiveness of an advertising campaign. In general, after an advertising campaign is complete, all households can be classified as exposed households and remaining, unexposed households. Exposed households (also referred to as an 'exposed group') can be ones that were successfully targeted. For example, a targeted household can be deemed exposed when the campaign was rendered to at least one household member, such as a sidebar advertisement during the member's use of a social media website. In another example, the targeted household is deemed exposed if the user interacts with the advertisement, such as by clicking on it. Accordingly, in some embodiments, an unexposed household can be one that was targeted but none of the household members saw and/or interacted with the campaign. In some embodiments, the unexposed households can include households that were not targeted.

In some embodiments, the measurement module 132 is configurable to select a subgroup or 'control group' from the unexposed households that is representative of the exposed group based on certain matching or alignment characteristics. In some embodiments, an unexposed household can be selected for the control group based on or more of the following aspects/characteristics associated with each household profile: target demographics, platform usage, pre-campaign period transaction data filtered by promoted entity and/or channel, and/or the like. In some embodiments, an unexposed household can be selected for the control group based on transaction data that is acquired from a particular data source (e.g. the data source 150a), which can correspond to a specific retailer, or data partner with whom a contractual relationship exists. Said another way, the control group can be 'aligned' and/or otherwise matched with the exposed group based on these 'alignment' characteristics. In this manner, bias and differences in transaction behavior across exposed and unexposed households can be accounted for. In some embodiments, the alignment characteristics included in the matching process can be demographics, platform usage, prior transaction behavior, presence of transactions with various retail partners, and/or media consumption (e.g., Internet) activity.

In some embodiments, the control group can be predetermined, i.e., is known before the campaign is run, and includes households that match campaign target criteria but are deliberately not exposed to the campaign. In some embodiments, the control group can be determined by a clustering approach, where matching, unexposed households are further sub-grouped based on what are considered the most important of the alignment characteristics. In some embodiments, a control group of unexposed households can be selected by aligning or matching each exposed household to an unexposed household based on the abovementioned alignment characteristics. In some embodiments, the alignment between exposed and unexposed households to select a control group can be achieved by using a logistic regression model to identify unexposed households that are similar to exposed households. The regression model can be used to estimate the likelihood (i.e. a score, such as a propensity score) that an unexposed household would have been targeted with the campaign based on the alignment characteristics. The use of a regression model can be employed to find a control group with similar characteristics to the exposed group, where the control group and the exposed group may or may not otherwise precisely match on any particular alignment characteristic. Said another way, since households with similar scores share similar alignment characteristics, it follows that choosing a group of unexposed households that show the same distribution of scores observed for the exposed group can ensure that the alignment characteristics across the exposed and control groups are similar, and thus that the control group is representative of the exposed group.

In some embodiments, the control group can be selected in the following manner: all the households in the database 140 can be partitioned into mutually exclusive and equally sized strata, where the stratification is score based. Next, within each stratum, unexposed households can be randomly sampled to obtain a constant ratio of exposed to unexposed households. The random sampling can be repeated any suitable number of times within each stratum to produce a group of control group candidates. The candidate that best represents the exposed group statistically (e.g., a candidate with the minimum Euclidean distance between the means of the variables from the exposed group and the candidate) can be chosen as the control group. In this manner, score distributions can be synchronized across exposed and control households, and a control group can be suitably selected corresponding to each exposed group for each score grouping.

Still referring to the measurement module 132, in some embodiments, the control group can be determined by a combination/hybrid of the various approaches detailed above. For example, the control group can be determined by using a hybrid clustering/regression model approach. Using this approach, the most important of the alignment characteristics can be the basis to partition the unexposed households into distinct clusters or strata. Within each stratum, a model can then be used to further partition the cluster into subgroups and match on the remaining characteristics by appropriately weighting the unexposed households. This hybrid approach can allow a relatively more precise match based on the most important alignment characteristic(s), while maintaining a high quality match on the remaining alignment characteristics, and while still ensuring that, in aggregate, the control group is still representative of the exposed group.

In some embodiments, the measurement module 132 is configurable to perform one or more diagnostic assessments on the determined control groups for statistical soundness. For example, in some embodiments, the balance of covariates can be evaluated between the test and control groups. In some embodiments, where households in control groups are stratified (described earlier), checks can be performed to ensure that the number of households in each strata are identical, or within a certain tolerance. In some embodiments, the measurement module 132 is configurable to perform one or more diagnostic modifications on the determined control groups, including, but not limited to, removing outlier households, an/or removing entire strata if no suitable match is found with the exposed group. Further, in some embodiments, the measurement module 132 is configurable to perform one or more diagnostic modifications on the exposed group(s) to ensure that a satisfactory match can be made between the exposed and control groups. For example, exposed households that can't be represented in the 'unexposed' groups can be removed, such as outliers (i.e. exposed households that spent more than the largest spender in the control group, exposed households that spent less than the lowest spender in the control group, and so on). In another example, entire strata may be removed from the exposed groups that appear to be outliers (e.g. strata where the exposed household spending is consistently 2% higher than for the corresponding unexposed households)

In some embodiments, once the control group is constructed, the measurement module 132 is further configurable to measure the effectiveness of the advertising campaign. In some embodiments, an analysis of covariance (ANCOVA) approach can be used to predict post-campaign spending at the household level. Generally, covariance is an estimate of the strength of relationship between variables of interest ("covariates") that can change together, while controlling for other variables that are not of primary interest. When performing ANCOVA in embodiments of the invention, the covariates can be related to, and selected from, one or more of demographics, pre-period transaction behavior, data-partner-match status (i.e. the data source), online activity, campaign exposure, and/or the like. ANCOVA can compensate for all other known data (e.g. demographics, pre-period transaction behavior, data partner match status, online activity, and/or the like) such that the difference between the exposed group and the control group can be essentially the difference in post-campaign spending for a "typical" (average) household in the test group vs. a "typical" (average) household in the control group. Using this "predicted" post-campaign spending, a revenue increase or 'measured revenue lift' can be calculated between each exposed group and its corresponding control group. The spending may be specified in any suitable manner, including, but not limited to, units of sale, units sold and/or amount spent per visit made by the consumer to the retailer, cost per unit to the consumer, and/or the like. In some embodiments, the measured revenue lift per household can be calculated by taking the difference in the least squares means of the exposed group and the control group.

Having described measured revenue lift, and referring to the earlier discussion of diagnostic assessments, it follows that some diagnostic assessments can ensure that there is no measurable difference between the exposed group and its corresponding (proposed) control group at some point prior to the campaign. For example, one can ensure that there is no statistically significant measured revenue lift between the exposed group and the control group prior to the advertising campaign, say a day before the campaign. A result to the contrary can be indicative of faulty control group construction As another example, when the households of the control group have been exposed to another campaign different from the campaign of interest, one can ensure that the responsiveness of the control group to the other campaign is accounted for when determining effectiveness of the campaign of interest; such determination(s) can include accounting for measured revenue lift due to the other campaign prior to and/or during the campaign of interest. Another form of diagnostic assessment can be to ensure there is no measurable/significant difference between the exposed group and its corresponding (proposed) control group for purchasing related to at least one other entity different from the promoted entity. A result to the contrary can be indicative of faulty group construction, i.e. of biased groups. It is understood that such an assessment can be made for a single campaign of a single promoted entity vs. multiple other entities, for multiple campaigns of the promoted entity in a manner as described above, and so on. The determination of what constitutes a measurable/significant difference can also be made in any suitable manner. In some embodiments, no measurable/significant difference exists if the measured revenue lift for the other entity/entities has a mean value within a specified tolerance about 0.0, a variance within a specified tolerance about 0.0, and/or the like.

It is understood that aspects of the invention are configurable in more complex campaign settings, and can be applied for more nuanced analysis than per household. For example, in some embodiments, the campaign can have served multiple ad types (e.g. video, audio, graphic, etc.), a different number of impressions for each ad type and/or for each advertising location (e.g. on a social media website, on a smartphone application, etc.), and/or targeted different demographics with different advertisements (e.g., male vs. female, urban vs. rural areas, etc.). The measurement module 132 is configurable to measure the revenue lift for each ad type (e.g. based on the impression type field 328 in FIG. 3), for each advertising location, for each impression (including a marginal value for each successive impression of multiple impressions aimed at the same household), for different advertising/impression content (e.g. different advertisements for the same promoted entity appealing to varying demographics), for each retailer (even when the promoted entity can be other than a retailer, such as a product), within each demographic of interest and/or across demographics of interest (e.g. regular buyers, and/or buyers switching to the promoted entity upon exposure to the campaign), and/or the like. In some embodiments, groups of interest can be defined by using the clustering approach described earlier. In some embodiments, the measurement module 132 is configurable to determine what component or percentage of the revenue lift arose from increased purchasing (that the campaign is directed to) by preexisting consumers of the promoted entity, e.g. of a product, vs. from first-time purchases of the product by new consumers acquired due to the campaign. In some embodiments, when the promoted entity is a retailer, the measurement module 132 is configurable to determine revenue lift for the retailer across all transactions conducted at the retailer post-campaign.

In some embodiments, the measurement module 132 is further configurable to account for unobserved transactions made by the exposed households. Unobserved transactions can include purchases made with cash, purchases made with non-partner entities, and/or any purchase not provided to the system 100 via data sources 150a-n, and that are thereby difficult to trace. Traceable transactions, on the other hand, can refer to any transaction other than one conducted solely by cash, such as by loyalty cards, gift cards, credit/debit cards, smartphone-based applications, virtual currency, transactions paid in cash where identifying information is manually entered or scanned, and/or the like. In some embodiments, accounting for unobserved transactions can be accomplished by scaling the revenue lift with a factor-up value that is representative of how much purchasing activity was captured via data sources 150a-n as compared to the amount of uncaptured purchasing activity that occurred at the household level. In some embodiments, the factor-up value can be a function of an outlet factor-up value and/or a channel factor-up value.

In some embodiments, the factor-up value can be derived by comparing the following data: (I) the observed/known average purchase amount per household observed in the exposed and control households/groups making purchases through a given channel prior to a campaign; and (II) the average purchase amount per household observed in a panel of households ('panel data') making purchases through a given channel or outlet prior to the campaign. In some embodiments, the purchase amount is for a particular product. In some embodiments, the purchase amount is for a particular retailer, i.e., for all transactions at the retailer. Generally, panel data can be any data of phenomena, behavior, and/or any activity associated with individual or group entities (e.g. households) that is known and can be used to control for data that cannot otherwise be measured and/or observed. The panel data can be time based, and/or based on any other suitable parameter. In some embodiments, panel data can be sourced from any suitable study and/or database, and can be generally representative of n-dimensional data that permits accounting for purchasing behavior of a panel of households over time.

Using the panel data, the outlet factor-up value can be calculated by dividing the observed average purchase amount per household in the exposed and control households/groups making purchases through a given channel (e.g. grocery) prior to a campaign by the average purchase amount per household observed in the panel of households making purchases through the same channel prior to the campaign.

Further, the channel factor-up value can be calculated by dividing the observed average purchase amount per household in the exposed and control households/groups making purchases through a given channel (e.g. grocery) prior to a campaign by the average purchase amount per household observed in the panel of households making purchases through all other channels (i.e. not grocery) unaccounted for. In some embodiments, the purchase amounts, and accordingly the channel factor-up value, can reflect purchases prior to the campaign. In some embodiments, at least a portion of the post-campaign purchase information can be employed in calculating the channel factor-up value. In such embodiments, aspects of the invention can account for known factors that will likely affect the post-campaign purchase information and should be accounted for. For example, if the promoted entity is a paper calendar product or a tax filing service, then it is likely to see a spike in sales at the beginning of every year, irrespective of the campaign. If the campaign for the promoted entity starts on January 1, then post-New Year purchasing information can be accounted for to provide a more accurate estimate of the channel factor-up value that can be applied in determining advertising effectiveness of the promoted entity in the post-New Year's period. As noted earlier, in some embodiments, information used to calculate the channel factor-up value can be made available directly by a manufacturer and/or distributor of the promoted entity.

The factor-up value can then be calculated by combining the cumulative effect reflected in the outlet-factor up value and the channel factor-up value in any suitable manner. In some embodiments, the factor-up value can be calculated by adding the outlet factor-up value and the channel factor-up value. In some embodiments, the factor-up value can be calculated by multiplying the outlet-factor up value and the channel factor-up value.

The total revenue lift that accounts for all traceable and untraceable purchases can be estimated by multiplying the measured revenue lift with the factor-up value.

As an illustrative and non-limiting example, consider a scenario where the observed average purchase amount per household of a promoted entity (e.g. a product) in the exposed and control households/groups making purchases through the grocery channel prior to an advertising campaign was $10, and the panel households spent $20 per year in grocery and another $30 per year in other channels on the same promoted entity, such as for the same product. Then, the outlet factor-up for the grocery outlet is $20/$10=2. Further, the channel factor-up for all other channels is $30/$10=3. When the factor-up value is calculated via multiplying the outlet factor-up and the channel factor-up, it has a value of 2+3=5. The total revenue lift is then=measured revenue lift*5. In other words, the calculated revenue lift accounts for just ⅕ or approximately 20% of all purchases for that product by exposed households based on the advertising campaign. In this manner, calculation of the factor-up value provides a more accurate understanding of revenues resulting from the advertising campaign.

Based on the discussions above, it is understood that in some embodiments, the measurement module 132 is configured to define a score for each consumer from a plurality of consumers, where the score can be based on (1) a purchase by a consumer, (2) a demographic value of the consumer, and (3) a retailer profile of the consumer. In some embodiments, the demographic value is household income. In some embodiments, the measurement module 132 defines the score for each particular consumer based on a number of digitally active consumers in a household of the particular consumer. Any suitable measure of digital activity can be employed that reflects the nature (e.g. amount of time, page hits, categories of websites being browsed, and so on) of the user's activity, and can further indicate whether the consumer and/or household is more or less likely to invest in the promoted entity. In this manner, digital activity of the consumer can be indicative of, but is not limited to, the likelihood that an opportunity to present the campaign to the user will actually arise (e.g. that an impression aimed at a consumer's social media profile will actually be rendered based on the consumer's social media usage), of how desirable a target the consumer is, of how likely it is for the consumer to receive impressions from other campaigns (e.g. a qualitative or quantitative measure of how 'eligible' and/or 'attractive' the consumer is to other campaigns), of how many campaigns are currently targeting and/or have previously targeted the consumer, and/or the like.

In some embodiments, the retailer profile (also termed 'first retailer profile') of the consumer is a grocery store category and a drug store category.

In some embodiments, the measurement module 132 is further configured to define a test group from the plurality of consumers that includes each consumer from the plurality of consumers that (1) was exposed to a communication for a promoted entity, and (2) includes a score within a range of scores. The test group can include information about a first purchase amount associated with the promoted entity. In some embodiments, the communication for the promoted entity is an offline advertisement for the promoted entity. In some embodiments, the score is a percentage, and the range of scores is less than about 10 percentage points. In some embodiments, the first purchase amount is associated with traceable purchasing activity of the test group for the promoted entity in the specified retailer profile.

In some embodiments, the measurement module 132 is further configured to define a control group from the plurality of consumers that includes each consumer from the plurality of consumers that (1) was not exposed to the communication for the promoted entity, and (2) includes a score within the range of scores, the control group including a second purchase amount associated with the promoted entity. In some embodiments, the second purchase amount is associated with traceable purchasing activity of the control group for the promoted entity in the specified retailer profile.

In some embodiments, the measurement module 132 is further configured to determine an initial effectiveness value based on (1) the first purchase amount and (2) the second purchase amount. In some embodiments, the initial effectiveness value is the measured revenue lift, and is calculated by subtracting the fourth purchase amount from the first purchase amount. The measurement module 132 can be further configured to send a signal indicative of a final effectiveness value to an entity of interest. The final effectiveness value is based on (1) the initial effectiveness value, and (2) a multiplier. The multiplier (also termed a 'first multiplier') can be based on a relationship between the first purchase amount and a third purchase amount from an opt-in group of consumers. In some embodiments, the opt-in group of consumers can be panel households, and the third purchase amount can be associated with traceable purchasing activity of the panel households for the promoted entity in the specified retailer profile. In some embodiments, the measurement module 132 is further configured to determine a second multiplier based on a relationship between the first purchase amount and a fourth purchase amount from an opt-in group of consumers. The fourth purchase amount can be associated with purchasing activity of the panel households in a second retailer profile that can be different from the first retailer profile.

The processor 122 can be any suitable processor configured to run and/or execute the module(s) included in the processor 122. Each module in the processor 122 can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor 122) capable of performing one or more specific functions associated with that module. In some embodiments, the processor 122 can include other module(s) (not shown in FIG. 2) configured to perform other function(s) for the apparatus 120. For example, the processor 122 can include a visualization module configured to generate different views of the household data in the database 140, of the total revenue lift for subpopulations of interest, and/or the like.

In some embodiments, the memory 124 can be, for example, a random-access memory (RAM) (e.g., a dynamic RAM, a static RAM), a flash memory, a removable memory, and/or so forth. Information associated with performing the collection, matching, and/or measurement processes can be stored, maintained and updated in the memory 124. In some embodiments, the memory 124 encompasses the database 140. Additionally, although not shown in FIG. 2, other data or information can be stored in other portions of the memory 124. For example, instructions associated with maintaining contractual relationships between the system 100 and one or more of the data sources 150a-n can be stored in a non-transitory process-readable medium within the memory 124.

FIG. 4 is a flow chart illustrating a method 400 according to an embodiment. In some embodiments, the method 400 is for calculating the factor-up value for a promoted entity associated with an advertising campaign. The method 400 can be performed by the apparatus 120, or any apparatus structurally/functionally similar to the apparatus 120. Particularly, instructions associated with performing the method 400 can be stored in a memory of the apparatus (e.g., the memory 124 of the apparatus 120 in FIG. 2) and executed at a measurement module in a processor of the apparatus (e.g., the measurement module 132 in the processor 122 of the apparatus 120 in FIG. 2).

At 402, the measurement module 132 can be configured to define a test group from a population of consumers that have been exposed to a communication associated with a promoted entity. In some embodiments, the communication associated with the promoted entity can be an online and/or offline advertisement for the promoted entity. In some embodiments, the communication can have one or more of a video component, an audio component, a clickable web link, an interactive component such as a dialog, a pop-up, a banner, a skyscraper, rich media such as DHTML and embedded scripts, an interstitial, an email, a text message, and/or the like. In some embodiments, the communication can be an advertisement for the promoted entity that is optimized for play on a specific digital device, such as on a notebook, or on a smartphone application. In some embodiments, the consumers can be households, and the test group can constitute exposed households. In some embodiments, the consumers can be individuals and the test group constitutes exposed individuals. In some embodiments, the consumers can be mobile phone users of a particular smartphone application, and the test group constitutes exposed mobile phone users. In some embodiments, the consumers are mobile phone users of a particular smartphone application, and the test group constitutes exposed mobile phone users. In some embodiments, the consumers are any entity having specific properties of demographics, psychographics, behavior (such as purchase history), firmographic variables, and/or the like; then, the test group constitutes exposed entities.

In some embodiments, the population of consumers can be obtained and/or otherwise defined from a matched consumer record that includes each record from a first consumer record set that has a hashed attribute string equal to a hashed attribute string of a record from a second consumer record set. In some embodiments, the first consumer record set and the second consumer record set can be associated with campaign data and transaction data respective, and the hashed attribute string is an HHID used to match the two to generate the matched consumer record.

The test group can include the following information: (1) a retailer profile, and (2) a first purchase amount associated with the promoted entity. In some embodiments, the retailer profile (also referred to as a 'first retailer profile') is associated with the channel of purchase of the promoted entity. In some embodiments, the retailer profile can be one or more of mass market retailer category, grocery retailer category, drug store retailer category, wholesale retailer category, any suitable retail category as established by the North American Industry Classification System (NAICS), and/or the like. In some embodiments, the first purchase amount can be associated with traceable purchasing activity of the exposed households for the promoted entity in the specified retailer profile. In some embodiments, the first purchase amount is zero; in other words, the exposed households have no traceable purchasing activity for the promoted entity, and can be households selectively targeted by the campaign for purposes of gaining new customers.

At 404, the measurement module 132 can be configured to receive purchase information associated with a third party. In some embodiments, the third party can be an opt-in panel group of consumers, such as a panel group of households. In some embodiments, the third party can be a manufacturer. The purchase information can include (1) a second purchase amount associated with the promoted entity, and (2) a third purchase amount associated with the promoted entity. In some embodiments, the second purchase amount can be associated with traceable purchasing activity of the panel households for the promoted entity in the specified retailer profile. In some embodiments, the third purchase amount can be associated with purchasing activity of the panel households in a second retailer profile that can be different from the first retailer profile.

At 406, the measurement module 132 can be configured to define a first multiplier based on a relationship between the first purchase amount and the second purchase amount. In some embodiments, the first multiplier can be an outlet factor-up value, and is obtained by dividing the second purchase amount by the first purchase amount. At 408, the measurement module 132 can be further configured to define a second multiplier based on a relationship between the first purchase amount and the third purchase amount. In some embodiments, the second multiplier can be a channel factor-up value, and is obtained by dividing the third purchase amount by the first purchase amount.

At 410, the measurement module 132 can be configured to send, transmit, and/or otherwise indicate a combined multiplier to any entity of interest. The combined multiplier can be based on the first multiplier and the second multiplier. In some embodiments, the combined multiplier is the factor-up value, and is calculated by adding the first multiplier and the second multiplier. In some embodiments, the combined multiplier can be the factor-up value, and is calculated by multiplying the first multiplier and the second multiplier.

In some embodiments, the measurement module 132 is further configured to define a control group from a population of consumers that have not been exposed to the communication. In some embodiments, the control group can constitute unexposed households. The control group can include information associated with the first retailer profile, and a fourth purchase amount associated with the promoted entity. In some embodiments, the fourth purchase amount can be associated with traceable purchasing activity by the control group for the promoted entity in the first retailer profile.

The measurement module 132 can be further configured to determine an initial effectiveness value based on (1) the first purchase amount and (2) the fourth purchase amount. In some embodiments, the initial effectiveness value can be the measured revenue lift, and is calculated by subtracting the fourth purchase amount from the first purchase amount. The measurement module 132 can be further configured to send a signal indicative of a final effectiveness value to an entity of interest. The final effectiveness value can be based on (1) the initial effectiveness value, and (2) the combined multiplier. In some embodiments, the final effectiveness value ca be the total revenue lift, and is calculated by multiplying the initial effectiveness value (e.g. the measured revenue lift) and the combined multiplier (e.g. the factor-up value).

In some embodiments, a non-transitory processor-readable medium (e.g. the memory 124 of the apparatus 120 of FIG. 2) stores code representing instructions to cause a processor (e.g. the processor 122 of the apparatus 120 of FIG. 2) to perform a process. In some embodiments, the process can calculate the factor up value for a promoted entity associated with an advertising campaign. FIG. 5 illustrates an operation 500 of the code, according to an embodiment. The code represents instructions to, at 502; define a test group from a population of consumers that have been exposed to an advertisement for a promoted entity. In some embodiments, the consumers are households, and the test group is a group of exposed households. In some embodiments, the code further represents instructions for obtaining and/or otherwise defining the population of consumers from a matched consumer record that includes each record from a first consumer record set that has a hashed attribute string equal to a hashed attribute string of a record from a second consumer record set. In some embodiments, the first consumer record set and the second consumer record set are associated with campaign data and transaction data respective, and the hashed attribute string is an HHID used to match the two to generate the matched consumer record.

The test group can include the following information: (1) a retailer profile, and (2) a first purchase amount associated with the promoted entity. In some embodiments, the retailer profile (also referred to as a 'first retailer profile') can be associated with the channel of purchase of the promoted entity. In some embodiments, the retailer profile can be mass market retailer category. In some embodiments, the retailer profile can be grocery retailer category. In some embodiments, the first purchase amount can be associated with purchases of the promoted entity (e.g. of a product and/or at a retailer) made through a loyalty card program, and can be traceable. In some embodiments, the first purchase amount can include purchases of the promoted entity made through an offline retailer, and can be still made available as traceable purchasing activity by a contractual relationship with the offline retailer.

The code also represents instructions to, at 504, define a control group from a population of consumers that have not been exposed to the advertisement for the promoted entity. In some embodiments, the control group can constitute unexposed households. The control group can include information associated with the first retailer profile, and a second purchase amount associated with the promoted entity. In some embodiments, the second purchase amount can be associated with traceable purchasing activity by the control group for the promoted entity in the first retailer profile.

The code also represents instructions to, at 506, receive purchase information associated with a third party. In some embodiments, the third party can be an opt-in panel group of consumers, such as a panel group of households. In some embodiments, the third party can be a manufacturer. The purchase information can include (1) a third purchase amount associated with the promoted entity, and (2) a fourth purchase amount associated with the promoted entity. In some embodiments, the third purchase amount can be associated with traceable purchasing activity of the panel households for the promoted entity in the specified retailer profile. In some embodiments, the fourth purchase amount can be associated with purchasing activity of the panel households in a second retailer profile that can be different from the first retailer profile.

The code also represents instructions to, at 508, define a first multiplier based on a relationship between the first purchase amount and the third purchase amount. In some embodiments, the first multiplier is an outlet factor-up value, and is obtained by dividing the third purchase amount by the first purchase amount. At 410, the code further represents instructions to define a second multiplier based on a relationship between the first purchase amount and the fourth purchase amount. In some embodiments, the second multiplier can be a channel factor-up value, and is obtained by dividing the fourth purchase amount by the first purchase amount.

The code also represents instructions, at 510, to send, transmit, and/or otherwise indicate a combined multiplier to any entity of interest. The combined multiplier can be based on the first multiplier and the second multiplier. In some embodiments, the combined multiplier can be the factor-up value, and is calculated by adding the first multiplier and the second multiplier. In some embodiments, the combined multiplier can be the factor-up value, and is calculated by multiplying the first multiplier and the second multiplier.

In some embodiments, the code also represents instructions to determine an initial effectiveness value based on (1) the first purchase amount and (2) the second purchase amount. In some embodiments, the initial effective value can be the measured revenue lift, and is calculated by subtracting the second purchase amount from the first purchase amount. The code can further represent instructions to send a signal indicative of a final effectiveness value to an entity of interest. The final effectiveness value can be based on (1) the initial effectiveness value, and (2) the combined multiplier. In some embodiments, the final effectiveness value can be the total revenue lift, and is calculated by multiplying the initial effectiveness value (e.g. the measured revenue lift) and the combined multiplier (e.g. the factor-up value).

Figure 6:
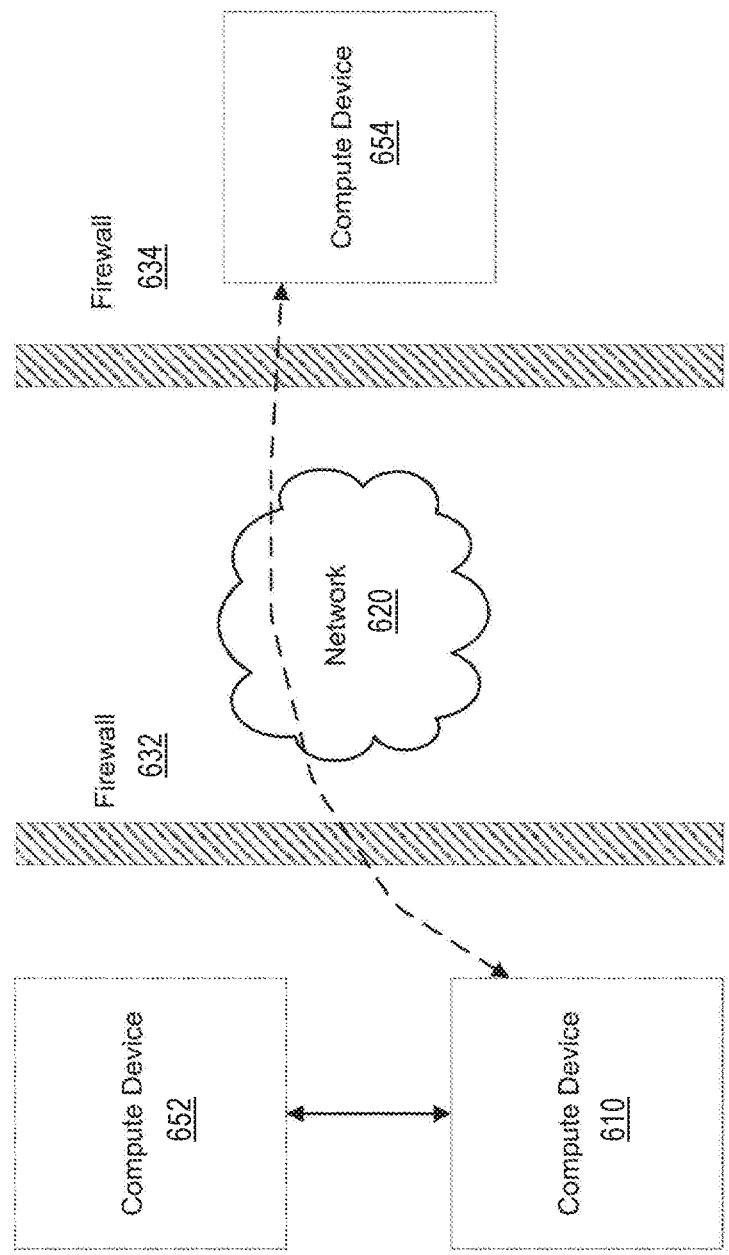
FIG. 6 is a schematic illustration of multiple compute devices configured to match record sets, according to an embodiment.

FIG. 6 is a schematic illustration of multiple compute devices 610, 652 and 654 configured to match record sets, according to an embodiment. As shown in FIG. 6, the compute device 610 is directly or operatively coupled to the compute device 652. The compute device 610 is also operatively coupled to the compute device 654 via at least a first firewall 632, a network 620 and a second firewall 634. As described below, the compute devices 610, 652 and 654 can be configured to, in coordination, perform a process to match records from multiple record sets.

The firewall 632 or 634 can be any software-based module and/or hardware-based device that is used to control and filter incoming and/or outgoing network traffic. The firewall 632 or 634 can be used to separate an internal network and an external network, thus to keep the internal network secure from the external network. In the example shown in FIG. 6, the firewall 632 separates an internal network that includes the compute device 652 and the compute device 610 from the external network 620; and the firewall 634 separates an internal network that includes the compute device 654 from the external network 620. In some embodiments, the firewall 632 or 634 can be, for example, a network-layer firewall (e.g., a packet filter firewall), a circuit-level firewall, an application-layer firewall, a proxy server, etc.

The network 620 can be any type of network that is external to the internal network behind the firewall 632 and the internal network behind the firewall 634, and connects the two internal networks (through the firewalls 632 and 634). The network 620 can be a wired network, a wireless network, or a combination wired/wireless network. In some embodiments, the network 620 can be, for example, a local area network (LAN), a wide area network (WAN), a wireless LAN (WLAN), the Internet, and/or the like.

A compute device (e.g., the compute device 610, 652, or 654) can be any device configured to produce, store, manipulate, and/or perform any other operation on one or more record sets. Such a compute device can be, for example, a server, a workstation, a data center, a data processing computer, or any other type of computing device or combination of computing devices.

In some embodiments, different compute devices can be configured to perform different functions. In the example of FIG. 6, the compute devices 652 and 654 can be configured to generate data files containing original record sets that are to be matched with other original record sets. Specifically, the compute device 652 and 654 can be configured to, for example, access and retrieve data from an external resource (e.g., a storage device), define one or more record sets based on the retrieved data, concatenate the defined record sets appropriately to generate one or more data files, store the data file(s) in a memory, send the data file(s) including the record sets to other devices (e.g., the compute device 610), and/or the like. On the other hand, the compute device 610 can be configured to match records from multiple original record sets to define one or more matched record sets. Specifically, the compute device 610 can be configured to, for example, receive data files containing original record sets (e.g., from the compute devices 652 and 654), compare and match records from multiple original record sets to define a matched record set, store the matched record set in a memory, send the matched record set to other devices (e.g., the compute device 652 or 654), and/or the like.

A record set defined and/or processed at the compute device 652, 654 or 610 can be any type of data structure that stores data in a data file. An original record set can be defined at the compute device 652 or the compute device 654, and further processed (e.g., compared to other original record set(s) to define a matched record set) at the compute device 610. A record set (e.g., an original record set, a matched record set) can be, for example, an array, a list, a table, a queue, a tree, a map, a graph, or any other suitable type of data structure. Data stored in a record set can be associated with, for example, users of a service, clients of a company, registered viewers of an online forum, buyers of a product, and/or the like. Such data can include, for example, an email address of a buyer, a login identification of an online viewer, a name (e.g., a surname, a first name) of a user, an address (e.g., a zip code, a street address) of a company, and/or the like In some embodiments, the compute devices 652 and 610 can be associated with a first entity such as, for example, a company, an organization, an individual, etc. In such embodiments, the compute devices 652 and 610 can be included in a first internal network (not shown in FIG. 6) that is associated with the first entity and separated from the external network 620 (e.g., the Internet) by the firewall 632. The compute device 652 and the compute device 610 can be directly coupled to each other or co-located on a single device (e.g., a data center) within the first internal network. Alternatively, the compute device 652 and the compute device 610 can be separate devices that are operatively coupled to each other via one or more other devices such as, for example, a service device, a routing device, another compute device, and/or the like. In some embodiments, the compute device 652 and the compute device 610 can be one compute device. In such embodiments, such a compute device can define original records sets and also define matched record sets based on multiple original records sets defined at that compute device and/or received from other compute device (e.g., the compute device 654). In addition, the record set(s) defined at the compute device 652 can be based on data associated with the first entity. For example, the first entity can be an online company, and the record sets defined at the compute device 652 can include data associated with registered users of a website of the company.

Similarly, the compute device 654 can be associated with a second entity (e.g., a company, an organization, an individual, etc.) different from the first entity. Thus, the compute device 654 can be included in a second internal network (not shown in FIG. 6) that is associated with the second entity and separated from the external network 620 (e.g., the Internet) by the firewall 634. In such embodiments, as shown in FIG. 6, the compute device 654 can be operatively coupled to the compute device 610 via at least the firewall 634, the network 620 and the firewall 634. In addition, the record set(s) defined at the compute device 654 can be based on data associated with the second entity. For example, the second entity can be a data analytics entity, and the record sets defined at the compute device 654 can include data associated with shoppers of one or more retail chain stores.

In some embodiments, although not shown in FIG. 6, the first internal network and/or the second internal network can be separated from the external network 620 by more than one firewall, or no firewall. In such embodiments, the compute device 610 and the compute device 654 can be coupled (directly or operatively) to each other via any number of firewalls, or without being separated by any firewall. Furthermore, in some embodiments, the compute device 610 can be external to both the first internal network and the second internal network. For example, the compute device 610 can be associated with a third entity different from the first entity and the second entity. As a result, the compute device 610 can be included in the network 620 between the firewall 632 and the firewall 634. In such embodiments, the compute device 610 can be operatively coupled to the compute device 654 via the firewall 632, and operatively coupled to the compute device 652 via the firewall 634.

In some embodiments, although not shown in FIG. 6, the compute device 610 can be operatively coupled to a fourth compute device via the firewall 632, the network 620, and/or a third firewall. The fourth compute device can be associated with a third entity different from the first entity and the second entity. Thus, the compute device 610 can receive record sets from the compute device 652, the compute device 654 and the fourth compute device, and perform a process to match records from the received records sets in a similar way as described herein with respect to FIG. 8.

Figure 7:
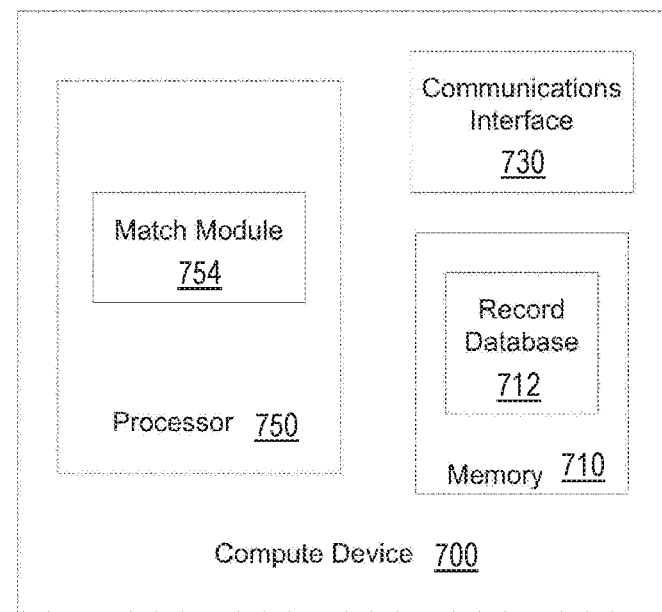
FIG. 7 is a block diagram of a compute device, according to an embodiment.

FIG. 7 is a block diagram of a compute device 700, according to an embodiment. The compute device 700 can be a compute device configured to match record sets received from other compute devices, similar to the compute device 610 in FIG. 6. As shown in FIG. 7, the compute device 700 includes a communications interface 730; a memory 710, which contains a record database 712 (e.g., storage for one or more data files, a relational database, etc); and a processor 750, which contains a match module 754. Operations of the communications interface 730 (e.g., transmit/receive data files) and the match module 754 (e.g., comparing record sets, producing a matched record set), as well as manipulations on the record database 712 (e.g., storing a data file, deleting a data file) or any other portion of the memory 710, can be controlled by the processor 750.

In some embodiments, the communications interface 730 of the compute device 700 can be associated with one or multiple ports (for wired connections, not shown in FIG. 7) and/or antennas (for wireless connections, not shown in FIG. 7) of the compute device 700. The communications interface 730 and the associated ports and/or antennas can be used to implement one or more wired and/or wireless connections between the compute device 700 and other compute devices (e.g., the compute devices 652, 654 in FIG. 6) or other devices (e.g., a display device, a storage device). Among those connections, the wired connections can be, for example, twisted-pair electrical signaling via electrical cables, fiber-optic signaling via fiber-optic cables, and/or the like, and the wireless connections can be based on any suitable wireless communication protocols (e.g., a Bluetooth protocol, a Wi-Fi protocol, etc.). As such, the compute device 700 can be configured to receive data (e.g., data files containing record sets, software updates and/or diagnostic tools, etc) from and/or send data to the other compute devices (e.g., the compute devices 652, 654 in FIG. 6) and/or other devices through one or more ports and/or antennas associated with the communications interface 730. In some embodiments, communications interface 730 can allow remote access to processor 750 by, for example, compute device 652, 654 in order to allow for software updates and/or diagnostic activities. Particularly, in some embodiments, one or more firewalls (e.g., the firewall 632 or 634 in FIG. 6) can be implemented at the communications interface 730, such that data transmitted through the communication interface 730 can be filtered appropriately.

The processor 750 can be any suitable processor configured to run and/or execute the module(s) included in the processor 750. Each module in the processor 750 can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor 750) capable of performing one or more specific functions associated with that module. Specifically, the match module 754 can be configured to perform a matching process for record sets, as described in detail with respect to FIG. 8 and FIGS. 9A-9L. Additionally, in some embodiments, the processor 750 can include other module(s) (not shown in FIG. 7) configured to perform other function(s) for the compute device 700. For example, the processor 750 can include a module configured to retrieve original record sets from other compute devices (e.g., the compute devices 652, 654 in FIG. 6) and transmit matched record sets to the other compute devices. For another example, the processor 750 can include a module configured to display record sets on a display device embedded within or coupled to the compute device 700.

In some embodiments, the memory 710 can be, for example, a random-access memory (RAM) (e.g., a dynamic RAM, a static RAM), a flash memory, a removable memory, and/or so forth Data and information associated with performing the matching process for record sets can be stored, maintained and updated in the memory 710. Specifically, record sets (including original record sets to be matched and matched record sets as a result of performing the matching process) can be stored and updated in the record database 712 within the memory 710. Additionally, although not shown in FIG. 7, other data or information associated with performing the matching process for record sets can be stored in other portions of the memory 710. For example, instructions associated with performing the matching process can be stored (e.g., as an instruction set) in a non-transitory process-readable medium within the memory 710.

Figure 8:
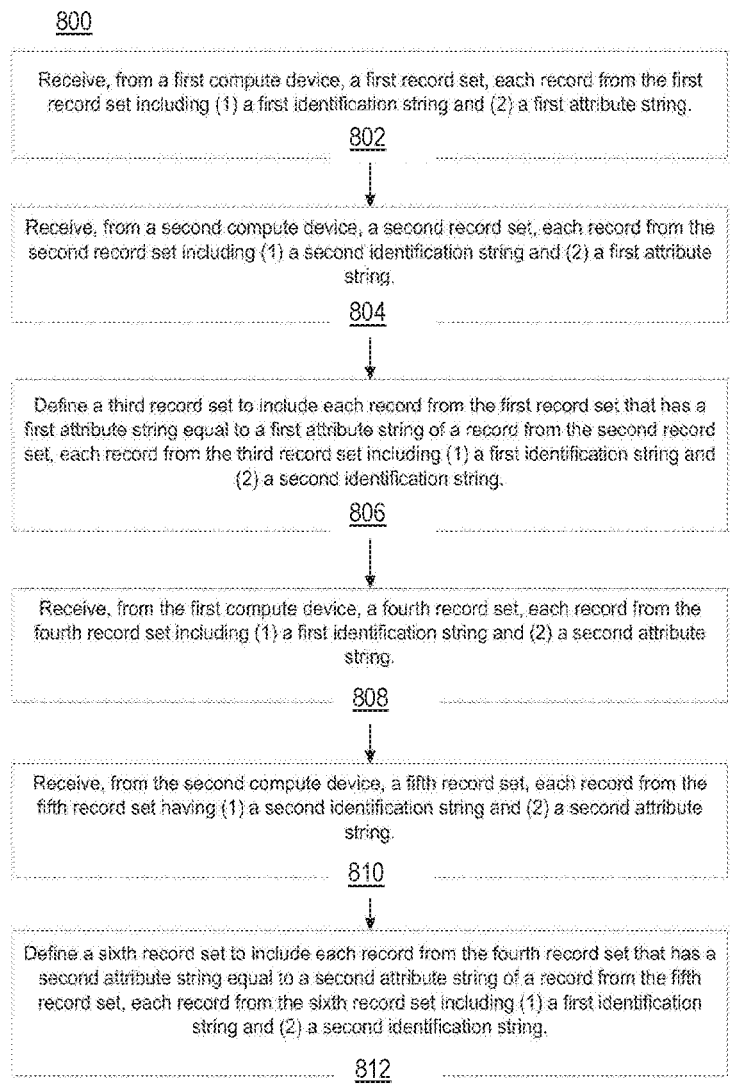
FIG. 8 is a flow chart illustrating a method for matching record sets, according to an embodiment.

FIG. 8 is a flow chart illustrating a method 800 for matching record sets, according to an embodiment. The method 800 can be performed at a compute device that is structurally and functionally similar to the compute device 610 and the compute device 200 shown and described with respect to FIGS. 6 and 2. Particularly, instructions associated with performing the method 800 can be stored in a memory of the compute device (e.g., the memory 210 of the compute device 200 in FIG. 2) and executed at a match module in a processor of the compute device (e.g., the match module 254 in the processor 250 of the compute device 200 in FIG. 2). An example of performing the method 800 is illustrated in detail with respect to FIGS. 9A-9L.

At 802, the match module can be configured to receive a first record set from a first compute device. For example, the first record set can be included in a data file sent from the first compute device to the compute device that hosts the match module. The first compute device can be structurally and functionally similar to the compute devices 652 and 654 shown and described with respect to FIG. 6. In some embodiments, the first record set can be defined and stored at the first compute device. In some other embodiments, the first record set can be defined at another device and then stored in the first compute device.

The first record set can be defined (e.g., at the first compute device) based on data associated with, for example, a first entity (e.g., a company, an organization, an individual) that owns or controls the first compute device. Furthermore, each record from the first record set can include at least a first identification string and a first attribute string associated with the first entity.

Each first identification string can be, for example, a text string (e.g., "user A"), a number (e.g., "999"), a code (e.g., "101a"), a symbol (e.g., "#"), combinations of the preceding, and/or in any other suitable format that can be included in the record. In some embodiments, each first identification string can be used to uniquely identify, for example, a user of the first entity. In other embodiments, more than one first identification string can be associated with, for example, a common user of the first entity.

Each first attribute string included in the first record set can be data representing a first attribute associated with, for example, a user of the first entity. The data can be, for example, a text string (e.g., "Lionel Messi"), a number (e.g., "21000"), or in any other format that is appropriate to represent the first attribute. The first attribute can be, for example, an email address of a user, a user's name or portion of a user's name (e.g., a surname, a first name), a delivery point (e.g., a delivery point associated with a delivery point barcode and/or an intelligent mail barcode, a complete address or portion of an address (e.g., a zip code, a city name), a combination of various items (e.g., a zip code and a surname), and/or the like. Thus, each pair of first identification string and first attribute string in a record from the first record set is associated with, for example, a user of the first entity.

At 804, the match module can be configured to receive a second record set from a second compute device different from the first compute device. For example, the second record set can be included in a data file sent from the second compute device to the compute device that hosts the match module. Similar to the first compute device, the second compute device can be structurally and functionally similar to the compute devices 652 and 654 shown and described with respect to FIG. 6. In some embodiments, the second record set can be defined and stored at the second compute device. In some other embodiments, the second record set can be defined at another device and then stored in the second compute device.

Similar to the first record set, the second record set can be defined (e.g., at the second compute device) based on data associated with, for example, a second entity (e.g., a company, an organization, an individual) that owns or controls the second compute device. The second entity can be different from the first entity. Furthermore, each record from the second record set can include at least a second identification string and a first attribute string associated with the second entity.

The second identification strings included in the second record set can be structurally similar to the first identification strings included in the first record set. In some embodiments, each second identification string can be used to uniquely identify, for example, a user of the second entity. In other embodiments, more than one second identification string can be associated with, for example, a common user of the second entity.

Similar to the first attribute strings included in the first record set, each first attribute string included in the second record set can be data representing the first attribute associated with, for example, a user of the second entity. The first attribute associated with the users of the second entity is the same as the first attribute associated with the users of the first entity. Such a first attribute can be, for example, an email address for a user of the first entity or a user of the second entity, a combination of zip code and surname of a user of the first entity or a user of the second entity, and/or the like. Each pair of second identification string and first attribute string in a record from the second record set is associated with, for example, a user of the second entity. Furthermore, a first attribute string in a record from the first record set can be identical to a first attribute string in a record from the second record set.

In some embodiments, the match module can be configured to receive the first record set from the first compute device, and receive the second record set from the second compute device, via one or more firewalls (e.g., the firewall 652, 654 in FIG. 6). In such embodiments, the first record set and the second record set received at the match module can be encrypted. For example, each first identification string in the first record set can be an encrypted value as a result of encrypting a raw first identification string using a first encryption key, and each second identification string in the second record set can be an encrypted value as a result of encrypting a raw second identification string using a second encryption key. The first encryption key can be different from the second encryption key. For another example, each first attribute string in the first record set can be a hashed value as a result of performing a hash function on raw data of a first attribute string associated with a user of the first entity; and each first attribute string in the second record data can be a hashed value as a result of performing the same hash function on raw data of a first attribute string associated with a user of the second entity. Particularly, as a result of applying the same hash function on the first attribute strings for the first record set and the second record set, a hashed first attribute string in the first record set and a hashed first attribute string in the second record set are identical if and only if their corresponding raw data of the first attribute string are identical Examples of such first record set and second record set are illustrated with respect to FIGS. 9A-9L.

In some embodiments, more than one level of encryption can be implemented on the first record set and the second record set before they are received at the match module. In some embodiments, the encryption key(s) or the hash function is not available at the compute device that hosts the match module. As a result, the corresponding data in the first record set and the corresponding data in the second record set cannot be decrypted or recovered at the compute device. Thus, in such an embodiment, the raw data (e.g., a raw first identification string, a raw second identification string, raw data of a first attribute string) associated with the users of the first entity or the users of the second entity is not available at the compute device that hosts the match module.

In some embodiments, additional information associated with a record set (e.g., the first record set, the second record set) can be sent from a compute device (e.g., the first compute device, the second compute device) to the match module along with that record set. Such additional information can include, for example, a priority level for the attribute associated with the record set (e.g., the first attribute). For example, "email address" as an attribute has a priority level of 1 (i.e., the highest priority level); "combination of zip code and surname" as an attribute has a priority level of 2 (i.e., the second highest priority level); and "zip code" as an attribute has a priority level of 8 (i.e., the third highest priority level (or the lowest priority level)). Particularly, in the example of method 800, the priority level for the first record set is the same as the priority level for the second record set, since the attribute associated with the first record set (i.e., the first attribute) is the same as that associated with the second record set.

In some embodiments, the additional information such as the priority level can be sent to the match module separately from the record set. In other embodiments, such additional information can be included in the record set (e.g., as a third item in each record along with the other two items, an identification string and an attribute string) and thus sent to the match module as the record set being sent to the match module.

At 806, the match module can be configured to define a third record set based on the received first record set and second record set, such that the third record set includes each record from the first record set that has a first attribute string equal to a first attribute string of a record from the second record set. For each such record from the first record set, the third record set includes a record including the first identification string from that record from the first record set, as well as the second identification string from the corresponding record from the second record set (i.e., the record from the second record set that has the first attribute string equal to the first attribute string of that record from the first record set).

The match module can be configured to compare the first record set and the second record set to define the third record set in various methods. In some embodiments, for example, the match module can be configured to compare the first attribute string in each record from the first record set to the first attribute string in each record from the second record set. If the two first attribute strings are equal, the match module can be configured to retrieve the first identification string from the record from the first record set and retrieve the second identification string from the record from the second record set, and then define a new record in the third record set to include the retrieved first identification string and the retrieved second identification string. Thus, the third record set is defined after such a method is performed on each pair of a record from the first record set and a record from the second record set. In other embodiments, the third record set can be defined in any other suitable method.

In some embodiments, as described above, all the data (e.g., identification strings, attribute strings) included in the records from the first record set and the second record set is encrypted data (e.g., encrypted by an encryption key, hashed by a hash function). In such embodiments, the operations (e.g., comparison, matching) executed at the match module are performed on the encrypted data. As a result, the data (e.g., identification strings) included in the records from the third record set is also encrypted data.

At 808, similar to the step of 802, the match module can be configured to receive a fourth record set from the first compute device. The fourth record set can be defined based on data associated with the first entity Each record from the fourth record set can include at least a first identification string and a second attribute string associated with the first entity. The number of records included in the fourth record set can be different from the number of records included in the first record set. A portion of the first identification strings included in the fourth record set can be identical to a portion of the first identification strings included in the first record set; while the second attribute strings included in the fourth record set are different from the first attribute strings included in the first record set, as the second attribute is different from the first attribute. Additionally, the second attribute has a priority level different than that of the first attribute. For example, the first attribute can be "email address," which has a priority level of 1; while the second attribute can be "combination of a zip code and a surname," which has a priority level of 2.

At 810, similar to the step of 804, the match module can be configured to receive a fifth record set from the second compute device. The fifth record set can be defined based on data associated with the second entity. Each record from the fifth record set can include at least a second identification string and a second attribute string associated with the second entity. The number of records included in the fifth record set can be different from the number of records included in the second record set. A portion of the second identification strings included in the fifth record set can be identical to a portion of the second identification strings included in the second record set: while the second attribute strings included in the fifth record set are different from the first attribute strings included in the second record set. Additionally, in some embodiments, data included in the fourth record set and the fifth record set can be encrypted similarly to data included in the first record set and the second record set.

At 812, similar to the step of 806, the match module can be configured to define a sixth record set based on the received fourth record set and fifth record set, such that the sixth record set includes each record from the fourth record set that has a second attribute string equal to a second attribute string of a record from the fifth record set. For each such record from the fourth record set, the sixth record set includes a record including the first identification string from that record from the fourth record set, as well as the second identification string from the corresponding record from the fifth record set (i.e., the record from the fifth record set that has the second attribute string equal to the second attribute string of that record from the fourth record set). Furthermore, similar to the third record set, the data (e.g., identification strings) included in the records from the sixth record set can be encrypted data.

In some embodiments, the method of defining a record set (e.g., the third record set, the sixth record set) based on two original record sets (e.g., the first and second record sets, the fourth and fifth record sets) can be repeated multiple times for multiple pairs of original record sets. In such embodiments, the original record sets can be paired based on different attributes of the users of the entities, which can be associated with different priority levels. For example, a first combined record set can be defined based on a first pair of original record sets for a first attribute "email address" with a priority level of 1, a second combined record set can be defined based on a second pair of original record sets for a second attribute "combination of zip code and surname" with a priority level of 2; a third combined record set can be defined based on a third pair of original record sets for a third attribute "zip code" with a priority level of 3; so on and so forth.

In some embodiments, the match module can be configured to perform a matching process based on two record sets (i.e., a record set that includes both first identification strings and second identification strings, and is defined based on two original record sets) such as the third record set and the sixth record set. Specifically, for example, the match module can be configured to define a matched record set based on the third record set and the sixth record set, such that 1) each record from the matched record set is a record from the third record set or a record from the sixth record set, and 2) the matched record set includes all or portion of the records from the third record set and the sixth record set. Such a matched record set can be defined based on the priority levels of the attributes associated with the third record set and the sixth record set, such that a record including a first identification string (and a second identification string) and associated with a lower priority level is excluded from the matched record set if another record including the same first identification string (and a second identification string) and associated with a higher priority level is included in the matched record set. Furthermore, each record from the third record set and the sixth record set is included in the matched record set if that record is not excluded by the above criterion.

For example, if the first attribute (e.g., "email address") is associated with a higher priority level and the second attribute (e.g., "zip code") is associated with a lower priority level, then each record from the third record set (including the first attribute strings) is included in the matched record set. For each record from the sixth record set (including the second attribute strings), if that record has a first identification string that is included in a record from the third record set, then that record from the sixth record set is excluded from the matched record set; otherwise that record from the sixth record set is included in the matched record set.

Additionally, note that the first identification and the second identification are exchangeable in such a matching process. That is, the order of receiving the first pair of record sets (i.e., the first record set and the second record set) and receiving the second pair of record sets (i.e., the fourth record set and the fifth record set), which is equivalent to the order of the first identification and the second identification, can be exchangeable. In other words, the matching process can also be performed in a manner such that a record including a second identification string (and a first identification string) and associated with a lower priority level is excluded from the matched record set if and only if another record including the same second identification string (and a first identification string) and associated with a higher priority level is included in the matched record set.

In some embodiments, such a matching process described above can be implemented at the match module to define a matched record set based on more than two combined record sets that are associated with various priority levels for the attributes. As a result, each record including a first identification string and associated with a relatively lower priority level (from multiple priority levels) is excluded from the matched record set if and only if another record including the same first identification string and associated with a relatively higher priority level (from the multiple priority levels) is included in the matched record set.

The match module can be configured to implement the matching process described above in various methods. In some embodiments, the match module can be configured to implement a "dedupe-then-combine" method. For example, to match and combine the third record set with a higher priority level of attribute (i.e., the first attribute) and the sixth record set with a lower priority level of attribute (i.e., the second attribute), the match module can be configured to modify the sixth record set to a modified state to exclude each record from the sixth record set that has a first identification string equal to a first identification string of a record from the third record set. The match module can then be configured to combine the third record set and the sixth record set in the modified state to define a matched record set.

For another example, to match and combine the third record set with a priority level of 1 (i.e., the highest priority level), the sixth record set with a priority level of 2 (i.e., the second highest priority level) and a seventh record set (i.e., a combined record set) with a priority level of 3 (i.e., the third highest priority level), the match module can be configured to: 1) modify the sixth record set to a modified state to exclude each record from the sixth record set that has a first identification string equal to a first identification string of a record from the third record set; 2) modify the seventh record set to a modified state to exclude each record from the seventh record set that has a first identification string equal to a first identification string of a record from the third record set and each record from the seventh record set that has a first identification string equal to a first identification string of a record from the sixth record set: and 3) combine the third record set, the sixth record set in the modified state, and the seventh record set in the modified state to define a matched record set.

In some other embodiments, the match module can be configured to implement a "combine-then-dedupe" method. For example, to match and combine the third record set with a higher priority level of attribute (i.e., the first attribute) and the sixth record set with a lower priority level of attribute (i.e., the second attribute), the match module can be configured to combine the third record set and the sixth record set to define a matched record set in an initial state. The match module can then be configured to modify the matched record set in the initial state to a final state to exclude each record from the matched record set in the initial state that 1) has a first identification string equal to a first identification string of a record from the third record set, and 2) is associated with the sixth record set (or equivalently, associated with the second attribute).

For another example, to match and combine the third record set with a priority level of 1 (i.e., the highest priority level), the sixth record set with a priority level of 2 (i.e., the second highest priority level) and a seventh record set (i.e., a combined record set) with a priority level of 3 (i.e., the third highest priority level), the match module can be configured to 1) combine the third record set, the sixth record set and the seventh record set to define a matched record set in a first state; 2) modify the matched record set in the first state to a second state to exclude each record from the matched record set in the first state that (i) has a first identification string equal to a first identification string of a record from the third record set, and (ii) is associated with the sixth record set (or equivalently, associated with the second highest priority level) or associated with the seventh record set (or equivalently, associated with the third highest priority level), and 3) modify the matched record set in the second state to a third state (i.e., final state) to exclude each record from the matched record set in the second state that (i) has a first identification string equal to a first identification string of a record from the sixth record set, and (ii) is associated with the seventh record set (or equivalently, associated with the third highest priority level).

The two methods described above are examples of how to implement the matching process for two or more combined record sets. In some embodiments, the two methods can be combined in implementation. In other embodiments, the matching process can be implemented in any other suitable method. In some embodiments, the matched module can be configured to send a signal indicative of a matched record set to one or more compute devices that provide an original record set to the match module (e.g., the first compute device that provides the first record set and the fourth record set, the second compute device that provides the second record set and the fifth record set). Such a signal can be sent via, for example, a communications interface of the compute device that hosts the match module (e.g., the communications interface 230 of the compute device 200 in FIG. 2) Additionally, in some embodiments, the match module can be configured to send a combined record set such as the third record set or the sixth record set to the first compute device and/or the second compute device in a similar method.

In some embodiments, the priority levels associated with the attributes can be changed such that multiple combined record sets with various priority levels can be matched to define different matched record sets using the same method. As such, multiple matched record sets can be defined at the match module based on different order or priority levels associated with the attributes. The multiple matched record sets can further be compared and the best matched record set can be determined at the match module. In some embodiments, the match module can be configured to send the best matched record to one or more compute devices that provide an original record set to the match module (e.g., the compute devices 652, 654 in FIG. 6).

In some embodiments, a match module can define a report including characteristics of a matching process. In such an embodiment, the report can include, for example, a match rate (e.g., number of matches as a percent of total records) for each priority level, a number of matches for each priority level, a number of new matches (e.g. matches that are not excluded as duplicates) for a particular priority level, a cumulative number of matches as each priority level is added, and/or a cumulative match rate as each priority level is added. In such an embodiment, the match module can be configured to send a signal indicative of the report to one or more compute devices. In such an embodiment a compute device that receives the report can be configured to, for example, initiate an alarm and/or other notification if a match rate for each priority level is lower than a predetermined threshold for that priority level (or associated attribute) or for a particular combination of priority levels (or associated attributes), that a total number of matches is below a predetermined threshold for that priority level (or associated attribute) or for a particular combination of priority levels (or associated attributes), etc. In some embodiments, such a report can be used to manually and or automatically select which priority levels to use in a final matched record set and/or which order to de-duplicate a matched record set as described herein.

FIGS. 9A-9L illustrate a process of matching record sets, according to an embodiment. The process illustrated in FIGS. 9A-9L is an example with reference to the method 800 shown and described with respect to FIG. 8. The process can be executed at a match module similar to the match module 254 in FIG. 2 and the match module described with respect to FIG. 8, in coordination with compute devices shown and described with respect to FIGS. 6-8 (e.g., the compute devices 652, 654, 610 in FIG. 6, the compute device 200 in FIG. 2).

Figures 9A, 9B, 9C, 9D:
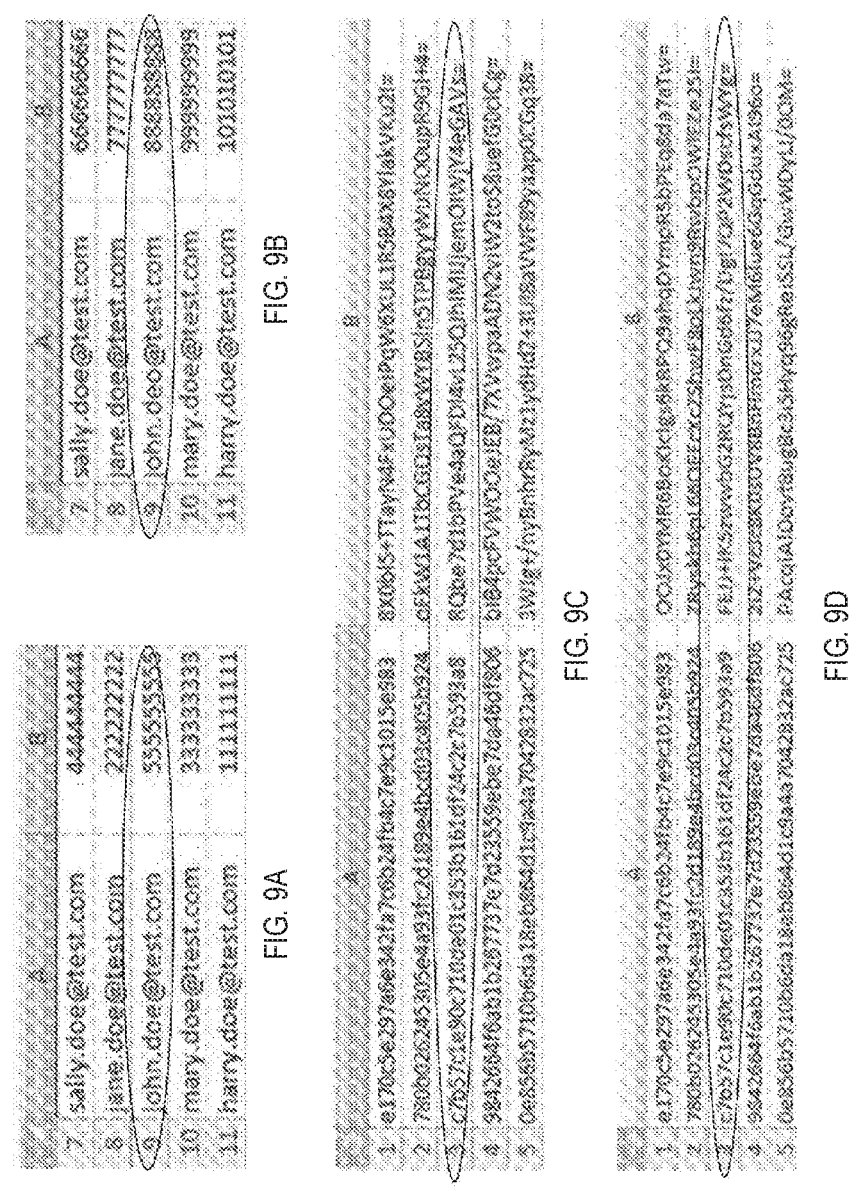

FIGS. 9A-9D illustrate a first set of record sets that are defined at the compute devices and/or sent from the compute devices to the match module. Specifically, FIG. 9A shows a first record set including raw data (i.e., not encrypted or hashed) that is defined at a first compute device (e.g., the compute device 652 in FIG. 6). The first record set includes data associated with a first attribute, email address, for users of a first entity (e.g., registered users of a website). As shown in FIG. 9A, the first record set includes at least an index column and two content columns: index column at the leftmost position, which includes an index (e.g., 7, 8) for each record stored in the first record set; column A of first attribute strings (e.g., sally.doe@test.com., jane.doe@test.com), which are email addresses of the users of the first entity, and column B of first identification strings (e.g., 444444444, 222222222), which are identifications associated with the corresponding users of the first entity. Thus, each record in the first record set includes a first attribute string (e.g., mary.doe@test.com) and a first identification string (e.g., 333333333) associated with a user of the first entity.

FIG. 9C shows a first encrypted record set that is encrypted from the first record set in FIG. 9A. Specifically, each first identification string (e.g., 555555555) in a record of the first record set is encrypted to produce, by using a first encryption key at the first compute device, an encrypted first identification string (e.g., "RQbe7d1bPVe4aQFDI4v L25QJhIMIJjemOlWjY4eGAVs=") that is stored in column B of a corresponding record of the first encrypted record set. Each first attribute string (e.g., john.doe@test.com) in a record of the first record set is hashed to produce, by using a hash function at the first compute device, a hashed first attribute string (e.g., "c7b57c1e90c710de01c353b161df 24c2c7b593a8") that is stored in column A of a corresponding record of the first encrypted record set.

Similar to FIG. 9A, FIG. 9B shows a second record set including raw data (i.e., not encrypted) that is defined at a second compute device (e.g., the compute device 654 in FIG. 6). The second record set includes data associated with the first attribute for users of a second entity (e.g., shoppers at a retail chain store). As shown in FIG. 9B, the second record set includes at least an index column and two content columns, index column at the leftmost position, which includes an index (e.g., 7, 8) for each record stored in the second record set; column A of first attribute strings (e.g., sally.doe@test.com, jane.doe@test.com), which are email addresses of the users of the second entity, and column B of second identification strings (e.g., 666666666, 777777777), which are identifications associated with the corresponding users of the second entity. Thus, each record in the second record set includes a first attribute string (e.g., mary.doe@test.com) and a second identification string (e.g., 999999999) associated with a user of the second entity.

Similar to FIG. 9C. FIG. 9D shows a second encrypted record set that is encrypted from the second record set in FIG. 9B. Specifically, each second identification string (e.g., 777777777) in a record of the second record set is encrypted to produce, by using a second encryption key (can be different from the first encryption key used at the first compute device) at the second compute device, an encrypted second identification string (e.g., "FEJJ+ 1K5zwwbG2RQYjsDnGd6fz/Dg17QP2WDscfsWYg=") that is stored in column B of a corresponding record of the second encrypted record set. Each first attribute string (e.g., john.deo@test.com) in a record of the second record set is hashed to produce, by using the hash function (same as that used at the first compute device) at the second compute device, a hashed first attribute string (e.g., "c7b57c1e90c710de01c353b161df24c2c7b593a9") that is stored in column A of a corresponding record of the second encrypted record set.

Figures 9E, 9F, 9G, 9H:
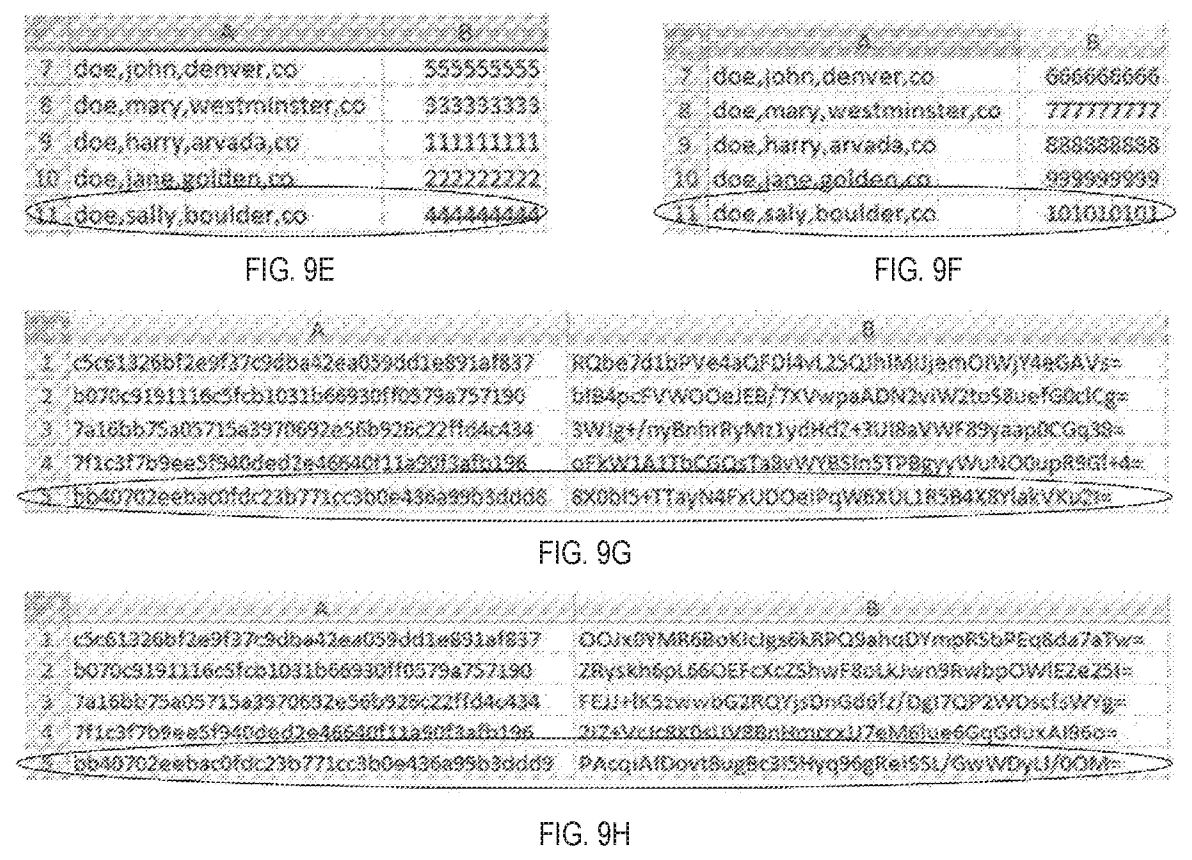

Similar to FIGS. 9A-9D. FIGS. 9E-9H illustrate a second set of record sets that are defined at the compute devices and/or sent from the compute devices to the match module. Specifically, similar to FIG. 9A, FIG. 9E shows a third record set including raw data that is defined at the first compute device. The third record set includes data associated with a second attribute, name and address (specifically, a combination of last name, first name, city and state), for users of the first entity. As shown in FIG. 9E, the third record set includes at least an index column and two content columns: index column at the leftmost position, which includes an index for each record stored in the third record set; column A of second attribute strings, which are names and addresses of the users of the first entity: and column B of first identification strings, which are identifications associated with the corresponding users of the first entity. Thus, each record in the third record set includes a second attribute string and a first identification string associated with a user of the first entity.

Similar to FIG. 9C, FIG. 9G shows a third encrypted record set that is encrypted from the third record set in FIG. 9E. Specifically, each first identification string in a record of the third record set is encrypted to produce, by using the first encryption key at the first compute device, an encrypted first identification string that is stored in column B of a corresponding record of the third encrypted record set Each second attribute string in a record of the third record set is hashed to produce, by using the hash function at the first compute device, a hashed second attribute string that is stored in column A of a corresponding record of the third encrypted record set.

Similar to FIG. 9B and FIG. 9E, FIG. 9F shows a fourth record set including raw data that is defined at the second compute device. The fourth record set includes data associated with the second attribute for users of the second entity. As shown in FIG. 9F, the fourth record set includes at least an index column and two content columns-index column at the leftmost position, which includes an index for each record stored in the fourth record set; column A of second attribute strings, which are names and addresses of the users of the second entity; and column B of second identification strings, which are identifications associated with the corresponding users of the second entity. Thus, each record in the fourth record set includes a second attribute string and a second identification string associated with a user of the second entity.

Similar to FIG. 9G and FIG. 9D, FIG. 9H shows a fourth encrypted record set that is encrypted from the fourth record set in FIG. 9F. Specifically, each second identification string in a record of the fourth record set is encrypted to produce, by using the second encryption key at the second compute device, an encrypted second identification string that is stored in column B of a corresponding record of the fourth encrypted record set. Each second attribute string in a record of the fourth record set is hashed to produce, by using the hash function at the second compute device, a hashed second attribute string that is stored in column A of a corresponding record of the fourth encrypted record set.

FIG. 9I illustrates a screen shot of a configuration file (waterfall.list as shown in FIG. 9I) that stores information of the first attribute (i.e., email) and the second attribute (i.e., a combination of last name, first name, city and state). In some embodiments, information associated with the priority levels for the first attribute and the second attribute can also be stored in such a configuration file. In the example of FIG. 9I, the first attribute is associated with an index 1 and the second attribute is associated with an index 2, which, in some embodiments, indicates that the priority level for the first attribute is higher than that for the second attribute. In some embodiments, such a configuration file can be stored in, for example, a memory associated with the match module (e.g., the memory 210 that is associated with the match module 254 in FIG. 2), and retrieved by the match module to facilitate performing the matching method when needed.

FIGS. 9J-9L illustrate results (intermediate combined record sets in FIGS. 9J and 9K and a final matched record set in FIG. 9L) of performing the matching process described in FIG. 8 on the record sets shown in FIGS. 9A-9H. Note that the record sets shown in FIGS. 9J-9L are decrypted versions for illustration and explanation purpose. Such a decrypted record set is typically not available at the match module or any other compute device (e.g., the first compute device, the second compute device), since the first encryption key and the second encryption key are typically not available at any single compute device at the same time.

The first compute device can send the first encrypted record set (shown in FIG. 9C) and the third encrypted record set (shown in FIG. 9G) to the match module; and the second compute device can send the second encrypted record set (shown in FIG. 9D) and the fourth encrypted record set (shown in FIG. 9H) to the match module. The match module can be configured to compare and combine the first encrypted record set and the second encrypted record set to define a first combined encrypted record set (not shown in the figures) according to the method described in step 806 and 812 in FIG. 8. FIG. 9J shows a decrypted version of the first combined encrypted record set. As shown in FIGS. 9A and 9B, since the first attribute string in the record with index 9 in the first record set (the email address john.doe@test.com highlighted in the circle in FIG. 9A) is different from the first attribute string in the record with index 9 in the second record set (the email address john.doe@test.com highlighted in the circle in FIG. 9B), these two records do not match. Each other record in the first record set matches a record in the second record set (in terms of the first attribute strings), and vice versa. As a result, the encrypted first identification strings in the matched records from the first record set and the encrypted second identification strings in the matched records from the second record set are included in the first combined encrypted record set, whose decrypted version is shown in FIG. 9J.

Similarly, the match module can be configured to compare and combine the third encrypted record set and the fourth encrypted record set to define a second combined encrypted record set (not shown in the figures) according to the method described in step 806 and 812 in FIG. 8. FIG. 9K shows a decrypted version of the second combined encrypted record set. As shown in FIGS. 9E and 9F, since the second attribute string in the record with index 11 in the third record set ("doe, sally, boulder, co" as highlighted in the circle in FIG. 9E) is different from the second attribute string in the record with index 11 in the fourth record set ("doe, saly, boulder, co" as highlighted in the circle in FIG. 9F), these two records do not match. Each other record in the third record set matches a record in the fourth record set (in terms of the second attribute strings), and vice versa. As a result, the encrypted first identification strings in the matched records from the third record set and the encrypted second identification strings in the matched records from the fourth record set are included in the second combined encrypted record set, whose decrypted version is shown in FIG. 9K.

Furthermore, the match module can be configured to, according to the matching method described with respect to FIG. 8, match and integrate the first combined encrypted record set (whose decrypted version is shown in FIG. 9J) and the second combined encrypted record set (whose decrypted version is shown in FIG. 9K) to define a final matched record set (whose decrypted version is shown in FIG. 9L). Particularly, because the first attribute (i.e., email address) has a higher priority than the second attribute (i.e., name and address) according to the configuration file in FIG. 9I, the records from the first combined encrypted record set (which is associated with the first attribute) have a higher priority than the records from the second combined encrypted record set (which is associated with the second attribute). As a result, each record from the first combined encrypted record set is included in the final matched record set; while each record from the second combined encrypted record set is included in the final matched record set if and only if that record does not have an encrypted first identification string equal to an encrypted first identification string in a record from the first combined encrypted record set. As shown in the decrypted versions in FIGS. 9J-9L, each record from the decrypted record set of FIG. 9J is included in the decrypted record set of FIG. 9L; while only the record with index 14 from the decrypted record set of FIG. 9K is included in the decrypted record set of FIG. 9L, as the other three records (with indexes 13, 15 and 16) from the decrypted record set of FIG. 9K have a first identification string (i.e., 999999999, 666666666, 777777777) equal to a first identification string in a record from the decrypted record set of FIG. 9J.

While shown and described above with respect to FIGS. 8-9L as a combined record set (e.g., the third record set or the sixth record set described in the method 800 in FIG. 8) being defined based on two original record sets (e.g., the first and second record sets described in the method 800, the fourth and fifth record sets described in the method 800), in other embodiments, such a combined record set can be defined based on more than two original record sets in a similar method. In such embodiments, the combined record set can include more than two identification strings. For example, a combined record set can be defined based on three original record sets by defining each record of the combined record set to include a first identification string in a record from the first original record set, a second identification string in a record from the second original record set, and a third identification string in a record from the third original record set, where each of the three records includes a common attribute string.

While the record sets shown and described with respect to FIGS. 9A-9L include index columns, in some embodiments, a record set can exclude index columns. In such embodiments, a priority level of a record in a matched record set can be indicated based on the order of the records in the record set unrelated to any column and/or row index. In some embodiments, a record and/or record entry can include metadata indicative of a priority level and/or associated attribute. In such embodiments, whether to include a record in a combined record set (e.g., whether or not to delete a duplicate entry, and which entry to delete) can be based on the order of the record and/or record entry and/or associated meta data.

While the record sets are described herein as including records associated with customers and/or users, in some embodiments, record sets can include manufactured and/or otherwise known records such that a match module can check the accuracy of a match. For example, a first entity can include a known record in a record set sent to the match module. Similarly, a second entity can include the same known record in a record set sent to the match module. In this manner, after the match module compares the record set from the first entity to the record set from the second entity, the match module can confirm that the known record is included in the matched record set. In such embodiments, the presence of the known record in the matched record set can confirm that the matching method is working, that a hash function used on records in the record sets was implemented properly, and/or that encryption used on the data file including a record set was implemented properly. In some embodiments, each pair of record sets (i.e. each pair of record sets associated with a priority level) can include a different known record.

The record sets, matched record sets, data files, etc, are described herein in various embodiments as including raw data, encrypted data and/or hashed data. In some embodiments, data can be transferred between entities without any encryption and/or hashing, encrypted and/or hashed data files with raw (not encrypted and/or hashed) data, and/or unencrypted data files with encrypted and/or hashed data. For example, a data file can be transmitted (encrypted or unencrypted) from one entity to another entity; and the data file can include a record set with a list of hashed, encrypted and/or raw identification strings each associated with a hashed, encrypted and/or raw attribute string. In some embodiments, a first entity, for example a data analytics entity, can match data with more than one other entity. In such embodiments, the data analytics entity can have access to a unique hash salt for each of the other entity, and each of the other entities can have only their unique hash salt.

In some embodiments described herein, a record set can be prepared at a first compute device and sent to a second compute device. For example, a first compute device can prepare a first record set that includes a first list of first identification strings associated with first attribute strings, and prepare a second record set that includes at least a portion of the list of first identification strings associated with second attribute strings. The first compute device can hash and/or encrypt (or leave raw) the first identification strings, the first attribute strings and/or the second attribute strings, and can encrypt (or leave unencrypted) the first record set and/or the second record set, and can send the record set to another compute device, including the compute device having a match module. In other embodiments, the first compute device can send one or more unprepared data files including one or more record sets that include the first identification strings, the associated first attribute strings and the associated second attribute strings. In such an embodiment, the compute device that receives the one or more unprepared data files can combine the data files, if necessary, and can prepare the first record set, to include the first identification strings and associated first attribute strings, and can prepare the second record set, to include the first identification strings and associated first attribute strings, and can send the first record set and/or the second record set to the match module. In some embodiments, the compute device having the match module can receive prepared records sets (e.g., record sets that a prepared to be matched) as well as unprepared record sets (e.g., record sets that are not prepared to be matched) In some embodiments, preparing a record set can include adding a hash salt to each record in a record set, e.g., adding the hash salt to each attribute string in a record set. In such an embodiment, records, specifically attribute strings, in a pair of record sets to be matched can include the same hash salt such that records having the same first attribute string will match.

While the match modules described above match records based on a record from one record set having an equal attribute string with a record from another record set, in other embodiments, a match module can match records based on from one record set having a probabilistically equivalent attribute string with a record from another record set. For an example, an attribute string associated with johndoe434@firstprovider.com can be probabilistically equivalent with an attribute string associated with johndoe434@secondprovider.com. Said another way, it is probable (e.g., above a predetermined degree of certainty) that a user associated with johndoe434@firstprovider.com is the same user as johndoe434@secondprovider.com, even though the attribute strings are not identical. Other examples can include matching nicknames with full names, etc.

The methods described herein are examples of how to implement factor-up value evaluation, and further, how to implement total revenue lift evaluation for determining advertising effectiveness. It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to devices (e.g., wireless access points, mobile communication devices) with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. A method for comprising:
transmitting, through a plurality of communication channels, a set of on-line communications that are associated with a particular on-line campaign;
collecting, by a collection module executing on a first compute device, first purchase information from one or more data sources external to the first compute device, the first purchase information comprising a first set of consumer records;
for each respective consumer record in the first set of consumer records:
hashing at least one attribute string associated with the respective consumer record to generate a corresponding anonymous household identifier; and
replacing, by the collection module executing on the first compute device, personal identifying information in the respective consumer record with the anonymous household identifier;
after replacing the personal identifying information in each consumer record in the first set of consumer records, storing the first set of consumer records in one or more data stores in association with a first retailer profile, wherein each consumer record in the first set of consumer records is not stored in the one or more data stores or matched to other records until after the personal identifying information has been replaced by the collection module;
defining, by a matching module executing on a second compute device, a population of consumers by matching hashed identification strings that anonymously identify recipient households of at least one on-line communication in the set of on-line communications with anonymous household identifiers in the first set of consumer records, the matching module prevented from directly interacting with the one or more data sources to maintain privacy of the personal identifying information replaced by the collection module;
wherein the first compute device and the second compute device communicate over a network via a firewall that is configured to filter incoming and outgoing network traffic;
collecting, by the collection module executing on the first compute device, second purchase information received from one or more data sources external to first compute device, the second purchase information comprising a second set of consumer records;
for each consumer record in the second set of consumer records:
hashing at least one attribute string associated with the respective consumer record to generate a corresponding anonymous household identifier; and
replacing, by the collection module executing on the first compute device, personal identifying information in the respective consumer record with the anonymous household identifier;
after replacing the personal identifying information in each consumer record in the second set of consumer records, storing the second set of consumer records in the one or more data stores, the second purchase information associated with a third party, the third party being one of a manufacturer or an opt-in panel, the second purchase information including a second purchase amount for offline purchases associated with a promoted entity and with the first retailer profile, and a third purchase amount associated with the promoted entity and with a second retailer profile different from the first retailer profile, wherein each consumer record in the second set of consumer records is not stored in the one or more data stores or matched to other records until after the personal identifying information has been replaced by the collection module;
defining, by a measurement module executing on one of the first compute device or the second compute device, a test group from a population of consumers, the test group different from the third party, that have been exposed to at least one on-line communication, in the set of on-line communications, that is associated with the promoted entity, each consumer in the test group being associated with the first retailer profile and a first purchase amount for offline purchases associated with the promoted entity and with the first retailer profile;

generating, by the measurement module, an indication of an effectiveness of the on-line communication in increasing offline purchasing activity by defining a first multiplier by dividing the second purchase amount by the first purchase amount, defining a second multiplier by dividing and the third purchase amount by the first purchase amount, and defining a combined multiplier by combining the first multiplier and the second multiplier;

transmitting, via one or more data communication networks, a notification of the indication of the effectiveness of the on-line communication in increasing offline purchasing activity based on the combined multiplier to a particular compute device that is associated with an identified user; and causing an application executing on the particular compute device to display a set of visual elements that identify a set of media exposure data, offline purchase data, and the indication of the effectiveness of the on-line communication, the displayed set of media exposure data and offline purchase data being linked by an anonymous household identifier generated through a hashed attribute string, wherein the set of visual elements presents the anonymous household identifier, a score based on a number of digitally active consumers in a household corresponding to the anonymous household identifier, a set of media exposure data that identifies dates and times when the digitally active consumers in the household were exposed to the on-line communication, and a set of transaction data that identifies products purchased by the digitally active consumers of the household.

2. The method of claim 1, wherein the promoted entity is one or more of the following: a product, a class of products, a brand of a product, a retailer, a manufacturer, a group, an organization, and/or a professional service.

3. The method of claim 1, wherein the first retailer profile is mass market retailer category.

4. The method of claim 1, wherein generating the indication of the effectiveness of the on-line communication in increasing offline purchasing activity further comprises:

defining a control group from a population of consumers that have not been exposed to the communication, the control group including the first retailer profile and a fourth purchase amount associated with the promoted entity;

determining an initial effectiveness value based on the first purchase amount and the fourth purchase amount; and defining a final effectiveness value based on the initial effectiveness value and the combined multiplier and wherein the final effectiveness value is provided as the indication of the effectiveness of the on-line communication in increasing offline purchasing activity.

5. The method of claim 1, wherein the third party is an opt-in panel group of consumers.

6. The method of claim 1, wherein the third party is a manufacturer.

7. The method of claim 1, the method further comprising defining the population of consumers from a matched consumer record set that includes each record from a first consumer record set that has hashed an attribute string equal to a hashed attribute string of a record from a second consumer record set.

8. The method of claim 1, wherein the communication associated with the promoted entity is an on-line advertisement for the promoted entity.

9. A system comprising: a plurality of compute devices each having one or more processors coupled to a memory on which is stored a set of instructions which, when executed by the one or more processors, causes:

transmitting, through a plurality of communication channels, a set of on-line communications that are associated with a particular on-line campaign;

collecting, by a collection module executing on a first compute device of the plurality of compute devices, first purchase information from one or more data sources external to the first compute device, the first purchase information comprising a first set of consumer records;

for each respective consumer record in the first set of consumer records:

hashing at least one attribute string associated with the respective consumer record to generate a corresponding anonymous household identifier; and replacing, by the collection module executing on the first compute device, personal identifying information in the respective consumer record with the anonymous household identifier;

after replacing the personal identifying information in each consumer record in the first set of consumer records, storing the first set of consumer records in one or more data stores in association with a first retailer profile, wherein each consumer record in the first set of consumer records is not stored in the one or more data stores or matched to other records until after the personal identifying information has been replaced by the collection module;

defining, by a matching module executing on a second compute device of the plurality of compute devices, a population of consumers by matching hashed identification strings that anonymously identify recipient households of at least one on-line communication in the set of on-line communications with anonymous household identifiers in the first set of consumer records, the matching module prevented from directly interacting with the one or more data sources to maintain privacy of the personal identifying information replaced by the collection module;

wherein the first compute device and the second compute device communicate over a network via a firewall that is configured to filter incoming and outgoing network traffic;

collecting, by the collection module executing on the first compute device, second purchase information received from one or more data sources external to the first compute device, the second purchase information comprising a second set of consumer records;

for each consumer record in the second set of consumer records:

hashing at least one attribute string associated with the respective consumer record to generate a corresponding anonymous household identifier; and replacing, by the collection module executing on the first compute device, personal identifying information in the respective consumer record with the anonymous household identifier;

after replacing the personal identifying information in each consumer record in the second set of consumer records, storing the second set of consumer records in the one or more data stores, the second purchase information associated with a third party, the third party being one of a manufacturer or an opt-in panel, the second purchase information including a second purchase amount for offline purchases associated with a promoted entity and with the first retailer profile, and a third purchase amount associated with the promoted entity and with a second retailer profile different from the first retailer profile, wherein each consumer record in the second set of consumer records is not stored in the one or more data stores or matched to other records until after the personal identifying information has been replaced by the collection module;

defining, by a measurement module executing on one of the first compute device or the second compute device, a test group from a population of consumers, the test group different from the third party, that have been exposed to at least one on-line communication, in the set of on-line communications, that is associated with the promoted entity, each consumer in the test group being associated with the first retailer profile and a first purchase amount for offline purchases associated with the promoted entity and with the first retailer profile;

generating, by the measurement module, an indication of an effectiveness, of the on-line communication in increasing offline purchasing activity by defining a first multiplier by dividing the second purchase amount by the first purchase amount, defining a second multiplier by dividing and the third purchase amount by the first purchase amount, and defining a combined multiplier by combining the first multiplier and the second multiplier;

transmitting, via one or more data communication networks, a notification of the indication of the effectiveness of the on-line communication in increasing offline purchasing activity based on the combined multiplier to the particular compute device that is associated with the identified user; and causing an application executing on the particular compute device to display a set of visual elements that identify a set of media exposure data, offline purchase data, and the indication of the effectiveness of the on-line communication, the displayed set of media exposure data and offline purchase data being linked by an anonymous household identifier generated through a hashed attribute string, wherein the set of visual elements presents the anonymous household identifier, a score based on a number of digitally active consumers in a household corresponding to the anonymous household identifier, a set of media exposure data that identifies dates and times when the digitally active consumers in the household were exposed to the on-line communication, and a set of transaction data that identifies products purchased by the digitally active consumers of the household.

10. The system of claim 9, wherein the promoted entity is one or more of the following: a product, a class of products, a brand of a product, a retailer, a manufacturer, a group, an organization, and/or a professional service.

11. The system of claim 9, wherein the first retailer profile is mass market retailer category.

12. The system of claim 9, wherein generating the indication of the effectiveness of the on-line communication in increasing offline purchasing activity further comprises:

defining a control group from a population of consumers that have not been exposed to the communication, the control group including the first retailer profile and a fourth purchase amount associated with the promoted entity;

determining an initial effectiveness value based on the first purchase amount and the fourth purchase amount; and defining a final effectiveness value based on the initial effectiveness value and the combined multiplier and wherein the final effectiveness value is provided as the indication of the effectiveness of the on-line communication in increasing offline purchasing activity.

13. The system of claim 9, wherein the third party is an opt-in panel group of consumers.

14. The system of claim 9, wherein the third party is a manufacturer.

15. The system of claim 9, wherein the memory further stores instructions which when executed by the one or more processors causes: defining the population of consumers from a matched consumer record set that includes each record from a first consumer record set that has hashed an attribute string equal to a hashed attribute string of a record from a second consumer record set.

16. The system of claim 9, wherein the communication associated with the promoted entity is an on-line advertisement for the promoted entity.

17. One or more non-transitory machine-readable media storing instructions which, when executed by one or more processors cause:

transmitting, through a plurality of communication channels, a set of on-line communications that are associated with a particular on-line campaign;

collecting, by a collection module executing on a first compute device, first purchase information from one or more data sources external to the first compute device, the first purchase information comprising a first set of consumer records;

for each respective consumer record in the first set of consumer records:
  hashing at least one attribute string associated with the respective consumer record to generate a corresponding anonymous household identifier; and
  replacing, by the collection module executing on the first compute device, personal identifying information in the respective consumer record with the anonymous household identifier;

after replacing the personal identifying information in each consumer record in the first set of consumer records, storing the first set of consumer records in one or more data stores in association with a first retailer profile, wherein each consumer record in the first set of consumer records is not stored in the one or more data stores or matched to other records until after the personal identifying information has been replaced by the collection module;

defining, by a matching module executing on a second compute device of the plurality of compute devices, a population of consumers by matching hashed identification strings that anonymously identify recipient households of at least one on-line communication in the set of on-line communications with anonymous household identifiers in the first set of consumer records, the matching module prevented from directly interacting with the one or more data sources to maintain privacy of the personal identifying information replaced by the collection module;

wherein the first compute device and the second compute device communicate over a network via a firewall that is configured to filter incoming and outgoing network traffic;

collecting, by the collection module executing on the first compute device, second purchase information received from one or more data sources external to the first compute device, the second purchase information comprising a second set of consumer records;

for each consumer record in the second set of consumer records:
 hashing at least one attribute string associated with the respective consumer record to generate a corresponding anonymous household identifier; and
 replacing, by the collection module executing on the first compute device, personal identifying information in the respective consumer record with the anonymous household identifier;

after replacing the personal identifying information in each consumer record in the second set of consumer records, storing the second set of consumer records in the one or more data stores, the second purchase information associated with a third party, the third party being one of a manufacturer or an opt-in panel, the second purchase information including a second purchase amount for offline purchases associated with a promoted entity and with the first retailer profile, and a third purchase amount associated with the promoted entity and with a second retailer profile different from the first retailer profile, wherein each consumer record in the second set of consumer records is not stored in the one or more data stores or matched to other records until after the personal identifying information has been replaced by the collection module;

defining, by a measurement module executing on one of the first compute device or the second compute device, a test group from a population of consumers, the test group different from the third party, that have been exposed to at least one on-line communication, in the set of on-line communications, that is associated with the promoted entity, each consumer in the test group being associated with the first retailer profile and a first purchase amount for offline purchases associated with the promoted entity and with the first retailer profile;

generating, by the measurement module, an indication of an effectiveness of the on-line communication in increasing offline purchasing activity by defining a first multiplier by dividing the second purchase amount by the first purchase amount, defining a second multiplier by dividing and the third purchase amount by the first purchase amount, and defining a combined multiplier by combining the first multiplier and the second multiplier;

transmitting, via one or more data communication networks, a notification of the indication of the effectiveness of the on-line communication in increasing offline purchasing activity based on the combined multiplier to the particular compute device that is associated with the identified user; and causing an application executing on the particular compute device to display a set of visual elements that identify a set of media exposure data, offline purchase data, and the indication of the effectiveness of the on-line communication, the displayed set of media exposure data and offline purchase data being linked by an anonymous household identifier generated through a hashed attribute string, wherein the set of visual elements presents the anonymous household identifier, a score based on a number of digitally active consumers in a household corresponding to the anonymous household identifier, a set of media exposure data that identifies dates and times when the digitally active consumers in the household were exposed to the on-line communication, and a set of transaction data that identifies products purchased by the digitally active consumers of the household.

18. The media of claim 17, wherein the promoted entity is one or more of the following: a product, a class of products, a brand of a product, a retailer, a manufacturer, a group, an organization, and/or a professional service.

19. The media of claim 17 wherein the first retailer profile is mass market retailer category.

20. The media of claim 17, wherein generating the indication of the effectiveness of the on-line communication in increasing offline purchasing activity further comprises:
 defining a control group from a population of consumers that have not been exposed to the communication, the control group including the first retailer profile and a fourth purchase amount associated with the promoted entity;
 determining an initial effectiveness value based on the first purchase amount and the fourth purchase amount; and
 defining a final effectiveness value based on the initial effectiveness value and the combined multiplier and wherein the final effectiveness value is provided as the indication of the effectiveness of the on-line communication in increasing offline purchasing activity.

21. The media of claim 17, wherein the third party is an opt-in panel group of consumers.

22. The media of claim 17, wherein the third party is a manufacturer.

23. The media of claim 17, further comprising instructions, which when executed by the one or more processors, cause: defining the population of consumers from a matched consumer record set that includes each record from a first consumer record set that has hashed an attribute string equal to a hashed attribute string of a record from a second consumer record set.

24. The media of claim 17, wherein the communication associated with the promoted entity is an on-line advertisement for the promoted entity.

* * * * *